(12) United States Patent
Gottlieb

(10) Patent No.: US 7,945,503 B2
(45) Date of Patent: May 17, 2011

(54) ON-LINE AUCTION INTERFACE

(75) Inventor: Harry N. Gottlieb, Chicago, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 377 days.

(21) Appl. No.: 12/036,040

(22) Filed: Feb. 22, 2008

(65) Prior Publication Data

US 2008/0234048 A1 Sep. 25, 2008

Related U.S. Application Data

(60) Provisional application No. 60/902,688, filed on Feb. 22, 2007.

(51) Int. Cl.
G06Q 40/00 (2006.01)
(52) U.S. Cl. ............................................. 705/37; 705/38
(58) Field of Classification Search ............... 705/37–38
See application file for complete search history.

(56) References Cited

U.S. PATENT DOCUMENTS

| | | |
|---|---|---|
| 4,789,928 A | 12/1988 | Fujisaki |
| 5,191,410 A | 3/1993 | McCalley et al. |
| 5,247,347 A | 9/1993 | Litteral et al. |
| 5,440,623 A | 8/1995 | Moore et al. |
| 5,508,731 A | 4/1996 | Kohorn |
| 5,537,143 A | 7/1996 | Steingold et al. |
| 5,561,707 A | 10/1996 | Katz |
| 5,563,937 A | 10/1996 | Bruno et al. |
| 5,740,240 A | 4/1998 | Jolissaint |
| 5,774,873 A | 6/1998 | Berent et al. |
| 5,794,219 A | 8/1998 | Brown |
| 5,815,551 A | 9/1998 | Katz |
| 5,818,914 A | 10/1998 | Fujisaki |
| 5,835,896 A | 11/1998 | Fisher et al. |
| 5,845,265 A | 12/1998 | Woolston |
| 5,890,138 A | 3/1999 | Godin et al. |

(Continued)

FOREIGN PATENT DOCUMENTS

WO WO 92/15174 9/1992

(Continued)

OTHER PUBLICATIONS

PCT International Search Report/Written Opinion of the International Searching Authority (the European Patent Office) regarding Application No. PCT/US2008/02376, dated Nov. 21, 2008, 10 pages.

(Continued)

*Primary Examiner* — Thu Thao Havan
(74) *Attorney, Agent, or Firm* — Brinks Hofer Gilson & Lione

(57) ABSTRACT

A method for conducting a fantasy sports auction for a plurality of players utilizing a plurality of pre-recorded multimedia clips is disclosed. The method includes initiating an auction session including a plurality of participating team bidders, selectively displaying data associated with an individual player during the auction session, and displaying a starting bid for the individual player on the user interface. A series of progressively higher bid levels associated with the player is displayed and the participating bidders are prompted to make bids by playing at least one of the multimedia clips. Bids are received from the participating bidders and visual representations are provided for each bid on the user interface. A winning bidder is determined based on the receipt of a bid associated with the highest bid level displayed.

38 Claims, 26 Drawing Sheets

U.S. PATENT DOCUMENTS

| | | | |
|---|---|---|---|
| 5,905,975 | A | 5/1999 | Ausubel |
| 6,012,045 | A | 1/2000 | Barzilai et al. |
| 6,058,417 | A | 5/2000 | Hess et al. |
| 6,085,176 | A | 7/2000 | Woolston |
| 6,161,099 | A | 12/2000 | Harrington et al. |
| 6,371,855 | B1 | 4/2002 | Gavriloff |
| 6,415,269 | B1 | 7/2002 | Dinwoodie |
| 6,665,649 | B1 | 12/2003 | Megiddo |
| 6,677,858 | B1 | 1/2004 | Faris et al. |
| 7,085,740 | B1 | 8/2006 | Meyers |
| 7,177,832 | B1 | 2/2007 | Semret et al. |
| 7,328,185 | B1 | 2/2008 | Gupta et al. |
| 7,475,034 | B2 | 1/2009 | Coyne et al. |
| 7,729,975 | B2 | 6/2010 | Ausubel et al. |
| 2001/0034697 | A1* | 10/2001 | Kaen ............... 705/37 |
| 2001/0051910 | A1 | 12/2001 | Snelgrove et al. |
| 2002/0013763 | A1* | 1/2002 | Harris ............... 705/38 |
| 2002/0032729 | A1 | 3/2002 | Erickson et al. |
| 2002/0049664 | A1 | 4/2002 | Hoffman et al. |
| 2002/0062276 | A1 | 5/2002 | Krueger et al. |
| 2002/0116320 | A1 | 8/2002 | Nassiri |
| 2003/0126061 | A1 | 7/2003 | Brett et al. |
| 2003/0208408 | A1 | 11/2003 | Garg et al. |
| 2003/0229564 | A1 | 12/2003 | Reddi et al. |
| 2004/0044614 | A1 | 3/2004 | Wagner |
| 2004/0110552 | A1 | 6/2004 | Del Prado |
| 2005/0021444 | A1 | 1/2005 | Bauer et al. |
| 2005/0125331 | A1 | 6/2005 | Dinwoodie |
| 2006/0206408 | A1 | 9/2006 | Nassiri |
| 2007/0055578 | A1 | 3/2007 | Ashton |
| 2007/0055606 | A1 | 3/2007 | Ausubel et al. |

FOREIGN PATENT DOCUMENTS

| | | |
|---|---|---|
| WO | WO 97/37315 | 10/1997 |

OTHER PUBLICATIONS

"Building and Running Online Auctions," Dr. Dobb's Journal, pp. 84, 86-88, and 91 (Oct. 1997).

Compact disc of demonstration shown in 2002.

"2002 Conference Program—International Conference on Intelligent User Interfaces," http://www.iuiconf.org/02program.html#closingremarks, 10 pages (2002).

"The Interactive Conversation Interface (ICI)," http://portal.acm.org/citation.cfm?id=502718&jmp=abstract&dl=GUIDE&dl=ACM, 2 pages (2002).

"The Interactive Conversation Interface (ICI): A Proposed Successor to GUI for an Interactive Broadband World," Harry Gottlieb, 1 page (2002).

"About the PARC Forum," http://www.parc.com/events/forum/videoarchive/default.php, 1 page (2002).

Anon, Untitled article, Communications Daily, vol. 14, No. 216, Nov. 8, 1994, 2 pgs.

Welch, M., "Santa's Helper," Boston Globe, third edition, Business section, p. E4, Dec. 25, 1997, 2 pgs.

* cited by examiner

ON-LINE AUCTION INTERFACE

RELATED APPLICATIONS

The present patent document claims the benefit under 35 U.S.C. §119(e) of Provisional U.S. Patent Application Ser. No. 60/902,688, filed Feb. 22, 2007, the content of which is hereby incorporated by reference for all purposes.

BACKGROUND

A fantasy sport (also known as rotisserie, roto, or fairy-tale sport; or owner simulation) is a game where fantasy owners build a team that competes against other fantasy owners based on the statistics generated by individual players or teams of a professional sport. Probably the most common variant converts statistical performance into points that are compiled and totaled according to a roster selected by a manager that makes up a fantasy team. These point systems are typically simple enough to be manually calculated by a "league commissioner." More complex variants use computer modeling of actual games based on statistical input generated by professional sports. It is estimated by the Fantasy Sports Trade Association that 16 million adults in the U.S., age 18 to 55, play fantasy sports. Fantasy sports is also popular throughout the world with leagues for football, cricket and other non-U.S. based sports.

Just like in real professional sports, such as NFL football, each year fantasy leagues have a draft in which each team drafts players. There are essentially two types of fantasy sports drafts, "serpentine" (or "snake") drafts and auction drafts. In a traditional "serpentine" or "snake" draft, owners take turns drafting players in a "serpentine" method, i.e. the owner who picks 1st in the odd rounds picks last in the even rounds, in the interests of fairness. In an auction draft, each owner has an (imaginary) budget which he must use to purchase all his players in an auction format, i.e. players are nominated and bid on, and the owner who bids the highest on each player receives that player (reducing their remaining budget accordingly).

Auction style drafting is growing in popularity among fantasy sports leagues because it makes the draft process more exciting, and offers participants more of a chance to acquire the players they want.

The auction drafting process must be managed by a person—usually a league's designated "commissioner." This draft manager (or commissioner) establishes nomination orders, coordinates the nomination and bidding processes, and enters the names of purchased players either into a document or an online database for future reference. Since leagues normally consist of more than 8 teams, this drafting process can be complicated to manage and usually takes several hours to complete. In addition, fantasy auction drafts require a higher level of aptitude from its participants than other types of fantasy sports drafts (e.g. "serpentine" drafts).

A problem with live online auctions in general is that they require at least three individual people to implement: an auctioneer, an online bid monitor, and a bid taker. If more than one buyer is bidding over the phone or online, typically one human bid taker is required for each such buyer. In scenarios outside of fantasy sports, it is not unusual to see five or more workers required to conduct an auction. The advantage of a live auction, of course, is that it can occur quickly—sometimes selling products in a matter of minutes—and in real time. It need only continue until the auctioneer sees that there are no more bids, at which point the highest bidder wins. This maximizes competition and excitement, but true excitement requires several people to implement. In an online sports fantasy environment with thousands of leagues participating, having thousands of auction workers to run a draft would simply not be possible.

Another problem with an auction draft that is managed by a live auctioneer and has bidders in the room raising paddles or hands in order to indicate a bid is that should two people bid close the same time, determining the winning bidder becomes a subjective decision by the auctioneer. The problem becomes even greater when a draft is managed by a live auctioneer and there are participants bidding remotely (via the phone, instant messaging technology, etc.). In this scenario, there is not always a fair opportunity for remote participants to win a bid due to network latency issues.

BRIEF SUMMARY

In a first embodiment, a method for conducting a fantasy sports auction for a plurality of players utilizing a plurality of pre-recorded multimedia clips is disclosed. The method includes initiating an auction session including a plurality of participating team bidders, representing the team bidders as icons on a user interface for the auction session, selectively displaying data associated with an individual player during the auction session, and displaying a starting bid for the individual player on the user interface. A series of progressively higher bid levels associated with the player is displayed and the participating bidders are prompted to make bids by playing at least one of the multimedia clips. Bids are received from the participating bidders and visual representations are provided for each bid on the user interface. A winning bidder is determined based on the receipt of a bid associated with the highest bid level displayed.

In a second embodiment, a method for conducting an online auction for a selected good utilizing a stored plurality of multimedia clips is disclosed. The method includes logging in participating bidders from said plurality of bidders, providing a dynamic visual representation of each of the participating bidders on a visual interface, and announcing the start of the auction to the participating bidders by playing at least one of the plurality of multimedia clips. A good is selected for bidding from a group of goods and a series of progressively higher bid levels is provided to the participating bidders and each of the participating bidders is enabled to execute progressive bid levels while visual representations are made for each bid execution with the visual interface. During the bidding, at least one of the plurality of multimedia clips is played. Finally, a winning bidder is determined, the selected good is associated with the winning bidder. The selection and bidding process is repeated for a plurality of goods remaining in the group and a simulated set of winning selected goods associated with each of the winning bidders is compiled.

In a third embodiment, a method for conducting an virtual auction in conjunction with the playing of a stored plurality of multimedia clips is provided. The method includes initiating an auction session including a plurality of participating bidders, displaying icons representative of the participating bidders, selectively displaying data associated with a plurality of virtual goods, and enabling the selection of a virtual good from the plurality of virtual goods by one of the participating bidders and displaying data related to the selected virtual good to the participating bidders. During the auction, a series of progressively higher bid levels associated with the selected virtual good is displayed to the participating bidders and the participating bidders are prompted to make bids by playing at least one of the multimedia clips. Bid execution signals are accepted from at least one of the participating bidders and representations are provided for each bid execution signal on the auction session display. A winning bidder is determined based on the receipt of a bid execution signal associated with the highest bid level displayed.

In an additional embodiment, a real-time, dynamic audio-visual experience is created based upon information to facilitate the auction draft of a fantasy sports character or good. The experience includes the visual interaction among several participating team bidders.

Additional features and advantages of the present invention are described in, and will be apparent from, the following Detailed Description and the figures.

DETAILED DESCRIPTION

Figure 1:
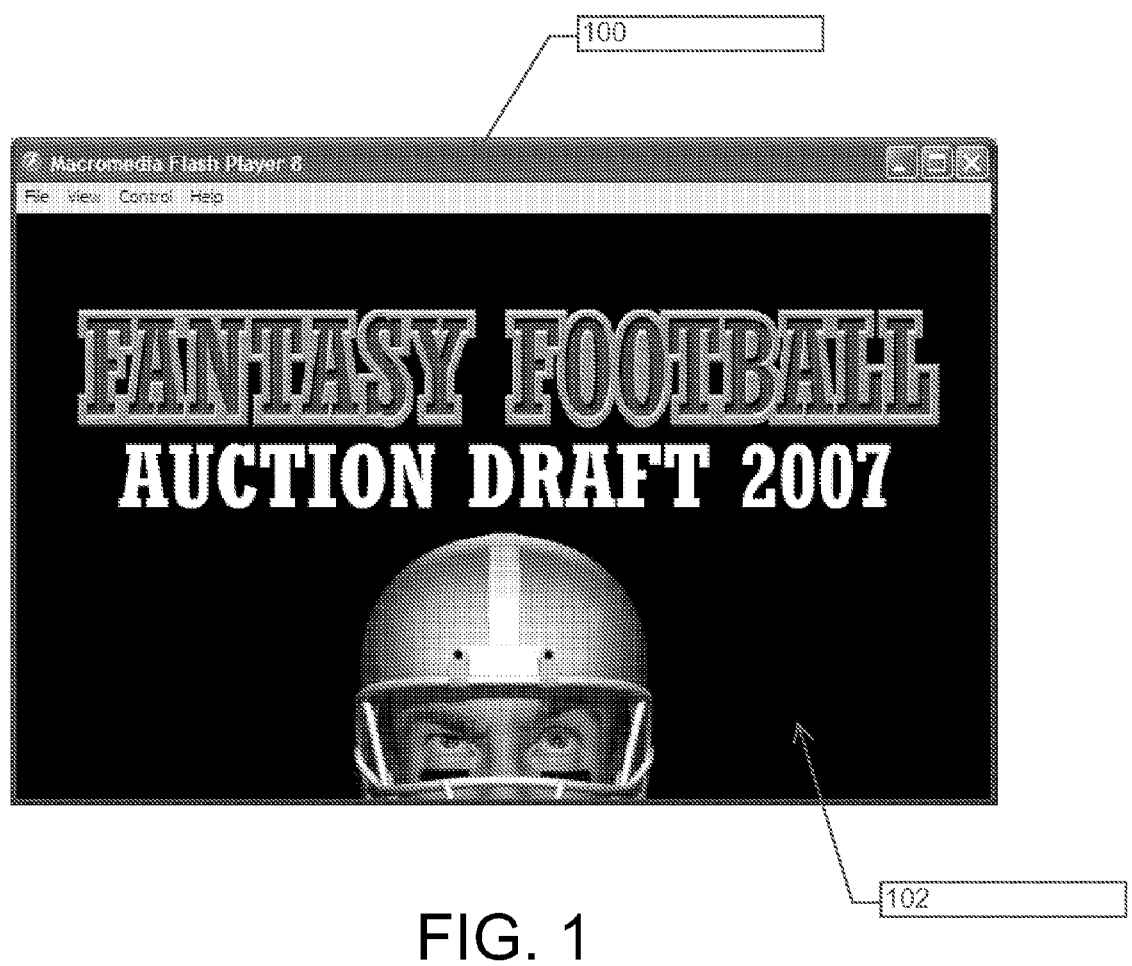
FIGS. 1-25 are illustrations of the display output of an application of a first embodiment.

The embodiments presented herein relate to an on-line, multi-user, virtual auction computer program with a virtual auctioneer (in one embodiment, fantasy sports auction software). In one embodiment, a virtual auctioneer manages and facilitates, in real-time, a fantasy sports auction draft. The automated facilitation of an auction draft using instructional audio and full motion animation makes auction drafts easier to understand and helps to reduce the overall time it takes to complete a draft. Interactivity, audio, and animation also add unique entertainment value to fantasy sports drafts. Other embodiments are described below, and each of these embodiments can be used alone or in combination with one another.

These embodiments may, but do not have to be, implemented using any of the methods and systems described in U.S. patent application Ser. Nos. 11/113,469 and 11/230,219, both of which are entitled "Method and System for Providing an On-Line Auction" and are hereby incorporated by reference (include the CD-ROM appendices included therein). These patent applications generally describe an on-line, multi-user, virtual auction computer program with a virtual auctioneer.

There are several advantages to using an automated computer program in this context. One advantage is that, by using an automated computer program, the draft process is expedited by establishing a consistent pace for the draft and requiring participants to make drafting decision within set time limits. For example, participants can be required to nominate a player within 15 seconds. With a virtual auctioneer managing the draft, there is no opportunity for participants to interrupt the drafting process (as there is when there is a live person managing the process). This helps to maintain the overall pacing of the draft, resulting in shorter durations for completing the entire drafting process.

An automated computer program also expedites the draft process by eliminating most of the need for human administration.

By having a virtual auctioneer that can provide player information (stats, etc.) and bidding instructions via audio, graphics, and animation, the overall aptitude required of auction draft participants is reduced. In other words, it is not as much of a disadvantage to be new to an auction style draft when an automated computer program is facilitating the auction versus a human auctioneer simply because instructions and other game related information are more effectively communicated through concise media clips.

These embodiments provide the technology to fairly identify who was the earliest bidder whether the bidders are bidding in the same room or bidding from separate, remote locations.

While there are existing fantasy sports auction draft management tools offered on the Internet or CD-ROM, these embodiments are unique in that they manage and facilitate, in real-time, the actual bidding process for fantasy sports auction drafts by providing, through the use of instructional audio and full motion animation, a virtual auctioneer.

The following descriptions provide greater detail regarding possible implementations of these preferred embodiments. They are intended to be illustrative rather than limiting and do not indicate a preference of implementation.

The methods described below implement these embodiments of sports auction drafts through modified versions of a computer based virtual auction and can include the following variants:

- A virtual fantasy sports auction draft program for any sport inside or outside of the United State of America.
- A virtual auction draft program for any type of fantasy game (e.g. "Fantasy Moguls") within or outside of the United State of America.
- A virtual auction program for the management and facilitation of a real-time auction of any type (non-fantasy related).
- A fully animated program, comprised of pre-recorded media clips or synthesized voice and graphical elements, that is dynamically generated based upon points awarded during a fantasy season. This animated program presents results of fantasy team match-ups and current league standing based upon these match-up results.

What should be taken from these example implementations is that these embodiments cover any technique by which a computer program may be used to manage and facilitate the auction of any item(s) through the use of instructional audio and full motion animation.

The following describes one particular embodiment, in which a method is provided wherein participants fictitiously purchase players by way of a mock auction in order to complete a mock roster, wherein the roster positions to be filled are established before the auction draft process in a database server. Based upon the weekly performance of sports players in actual live sporting events, value points can be awarded to the participants who have acquired said players during the auction draft process and with points being recorded in a database server. The participants can register online, create team names and upload graphic images for display as team logos during the experience.

This embodiment is preferably implemented using software and/or hardware components. For example, this embodiment can be implemented with a software application (i.e., computer-readable program code) running on a processor of a general-purpose computer. Alternatively, some or all of the functionality of the application can be implemented with application-specific hardware components. For simplicity, the term "application" shall be used herein to refer generally to the entity (be it software and/or hardware) used to implement the embodiment described below.

Turning now to the Figures, FIG. 1 illustrates this first embodiment wherein a program window 100 shows a fantasy sports auction display 102. The program window may be any interactive audiovisual interpreter, such as a web browser window or Flash player window. If desired, a "splash" animation and announcement may be made at the start of the auction to initiate the session when participants log into the auction. The application, including software logic and multimedia clips, may reside on one or more servers at a network host service or in other commonly used storage configurations. The application may track individual participants that have logged into the auction, authenticating login information and passwords to properly accept pre-arranged participants in the auction, such as previously registered fantasy teams in a particular fantasy league.

Figure 2:
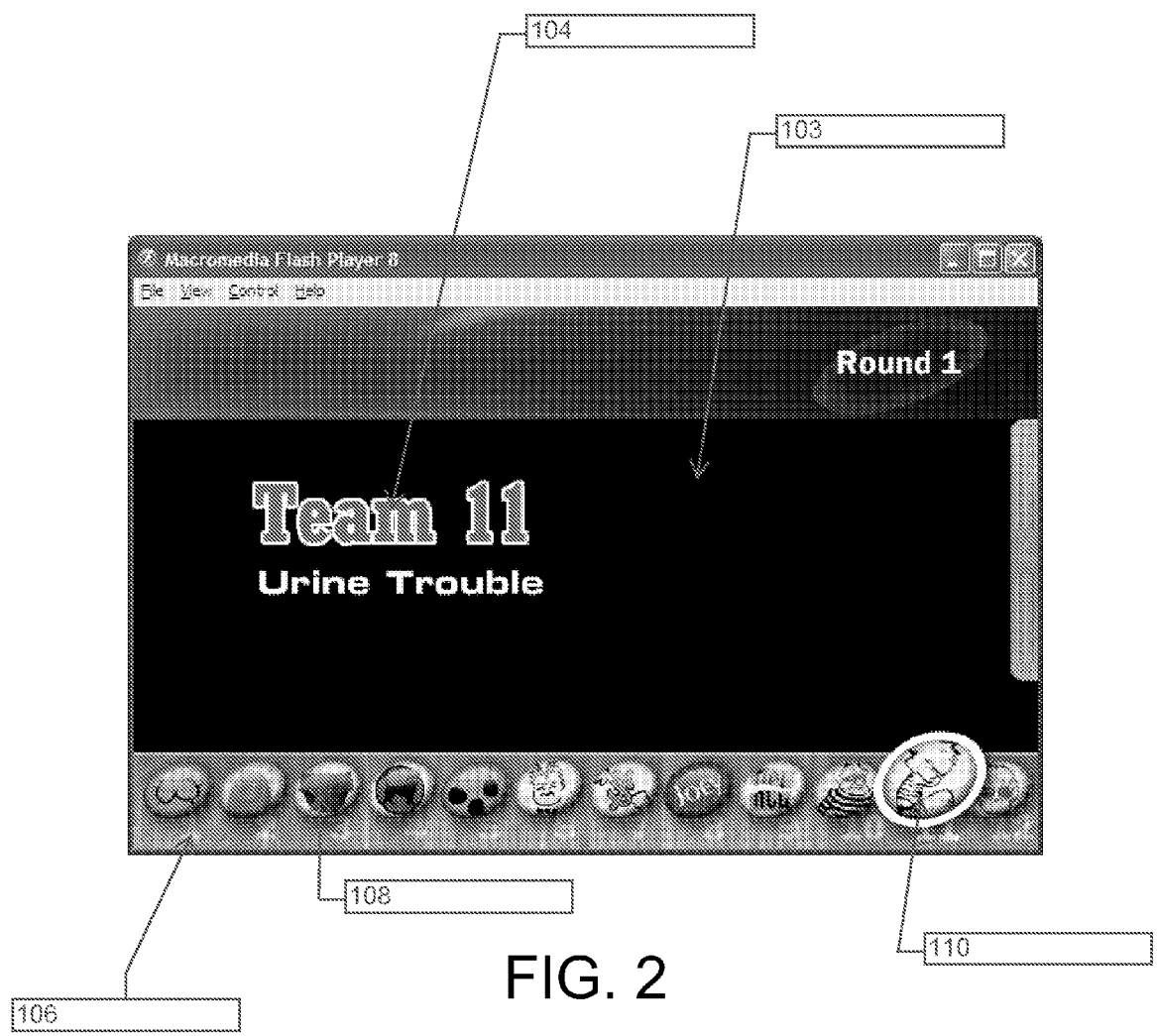
Figure 3:

FIG. 2 illustrates an initial screen interface seen by a participant or participating bidder in the auction. The team number 104 is announced by a prerecorded audio or audiovisual clip that is triggered by the application. The user interface 103 for the auction is preferably formatted to include a "gallery" of authorized participants or participating bidders. In this embodiment, the participating bidders are shown in a row of team icons 108 in a lower row 106 on the screen. Team 11 in this example is represented by the icon 110 as shown, and in the present example Team 11 is announced at the center of the interface screen 103 to have nominating privileges for the next fantasy athlete in the auction. Alternatively, or in addition to the icons 108, the participating bidders may be shown using a textual or graphical representation, The computer program can automatically generate a random nomination order based upon a database of authorized participants and/or registered team names that are recognized as being currently logged into the server. The program can assign team numbers to participants based on the established nomination order. Based on a nomination order, participants can be prompted to nominate a player either by a prerecorded media clip or synthesized voice, for example. In FIG. 3, through the use of the visual animation arrow 112, Team 11, through the icon 110, is prompted to enter a nominated player into the blank text box 114 as shown.

Figure 4:
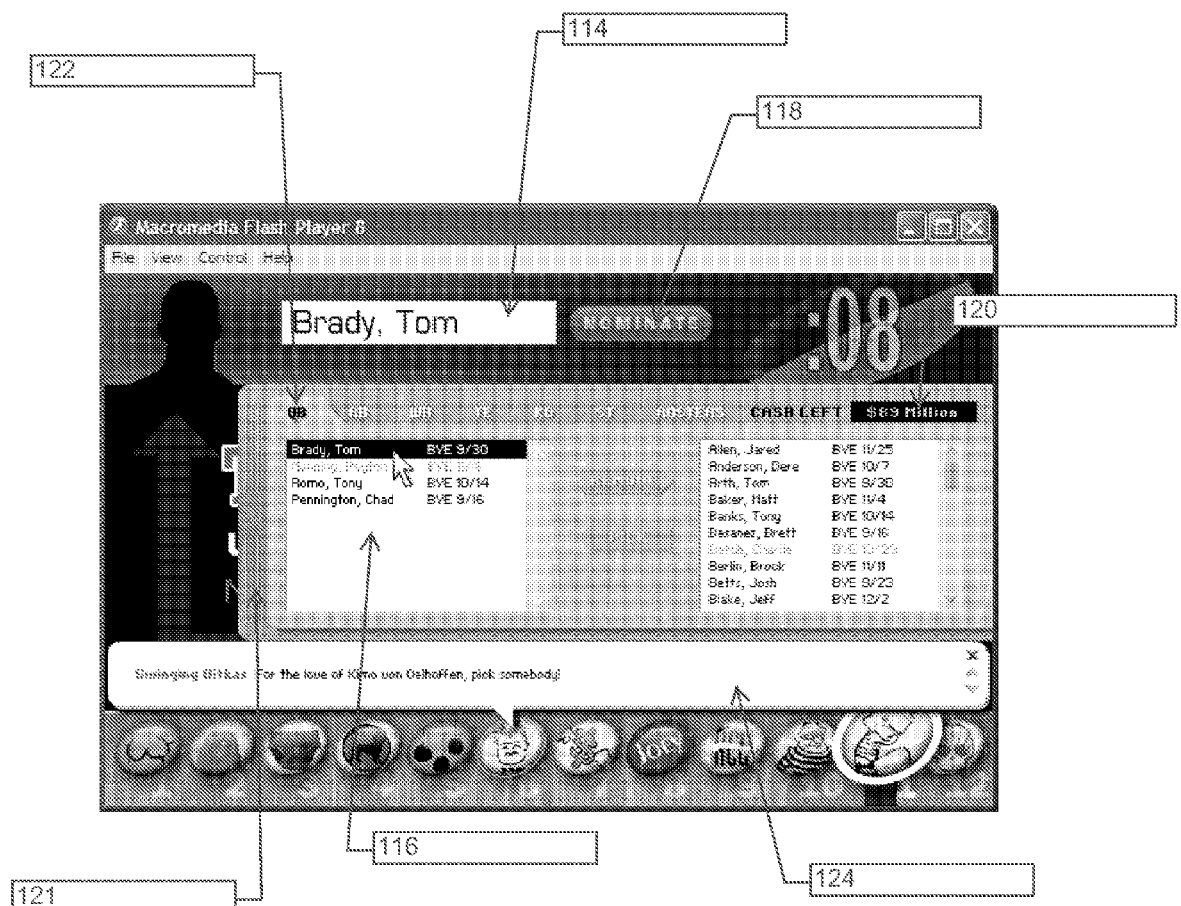

As shown in FIG. 4, the participating bidders can utilize a graphical user interface to select players for nomination in order to complete team rosters. The interface parameters can change based on a database list of required roster positions. For example, participating bidders can nominate a player by entering text into the box 114 or by selecting from a pull-out list 121 of available players 116 displayed within the interface and pressing a Nominate button 118. The particular athlete position may also be indicated, for example at 122 on the interface. A chat window 124 may be provided to the participating bidders to allow communication among participating bidders concurrently with the auction. The participants can be required to nominate a player within an established time limit. This time limit can be set manually by an administrator or by the program's default settings. A server database of team rosters can automatically be updated based upon the fictitious purchase of players during the auction draft process. A server database of team rosters can be automatically sent to registered participants via electronic mail.

A participant can be granted special privileges to adjust program settings including, for example, the number of teams, the total number of roster positions to be filled, the nomination order, and the time limit for nominating a player. The participants can register online and upload graphic images for display as owner photographs during the experience. The sports player images can be presented on the screen as items for purchase in a mock auction.

An animated timer can be displayed on the screen indicating how much time remains for a participant to nominate a player. The program can automatically determine the number of rounds of bidding based upon sets of criteria, such as, but not limited to, the number of participants registered in a database server and the established number of roster spots to be filled during the drafting process.

Figure 5:
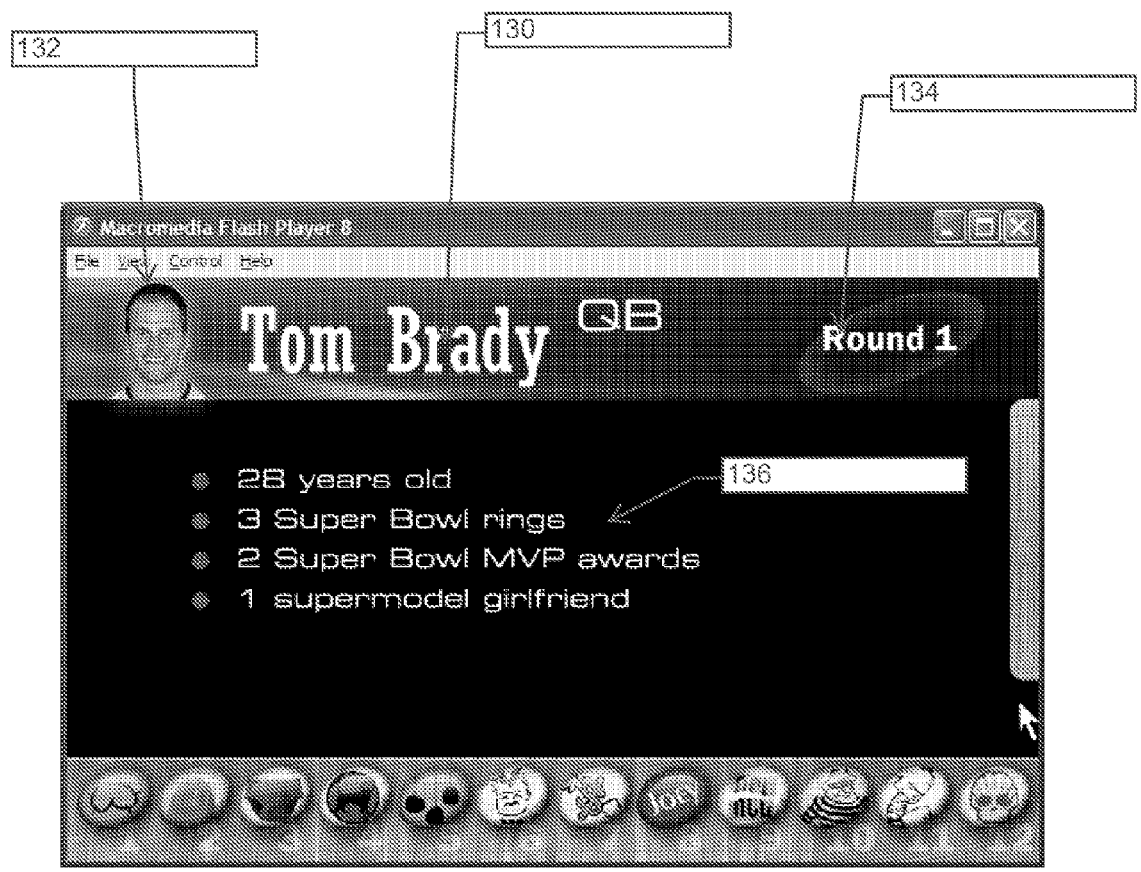
Figure 6:
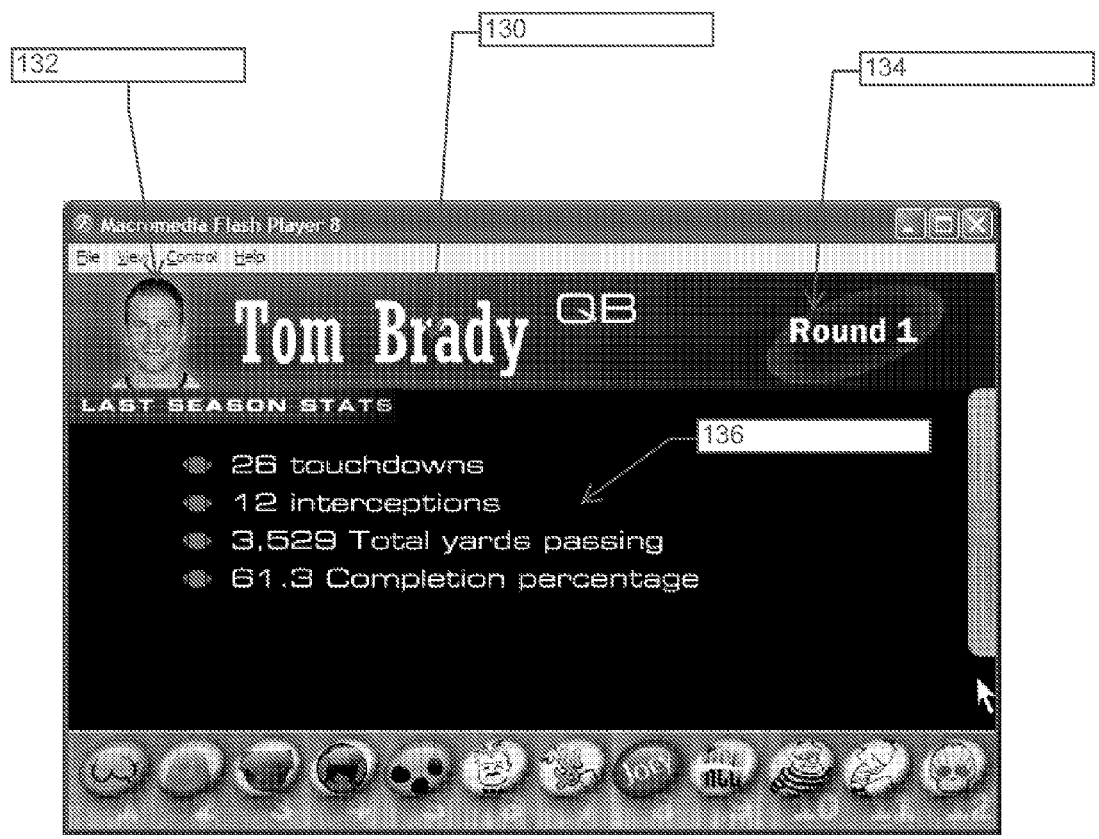
Figure 7:

Once an athlete is nominated, statistical information about the athlete may be displayed and announced through multimedia clips, which may include video, audio, or photography corresponding to the player. Also an announcement may be made by the auctioneer. This is illustrated in FIGS. 5-7, which show the athlete's image 132, name 130 and selected statistical information 136 that may be useful for the participating bidder or nominator. The program, having automatically determined the number of rounds of bidding, can display, on screen, the current round number during the auction process. For example, in FIGS. 5-7, the round for the athlete "Tom Brady" is displayed at 134.

Figure 8:
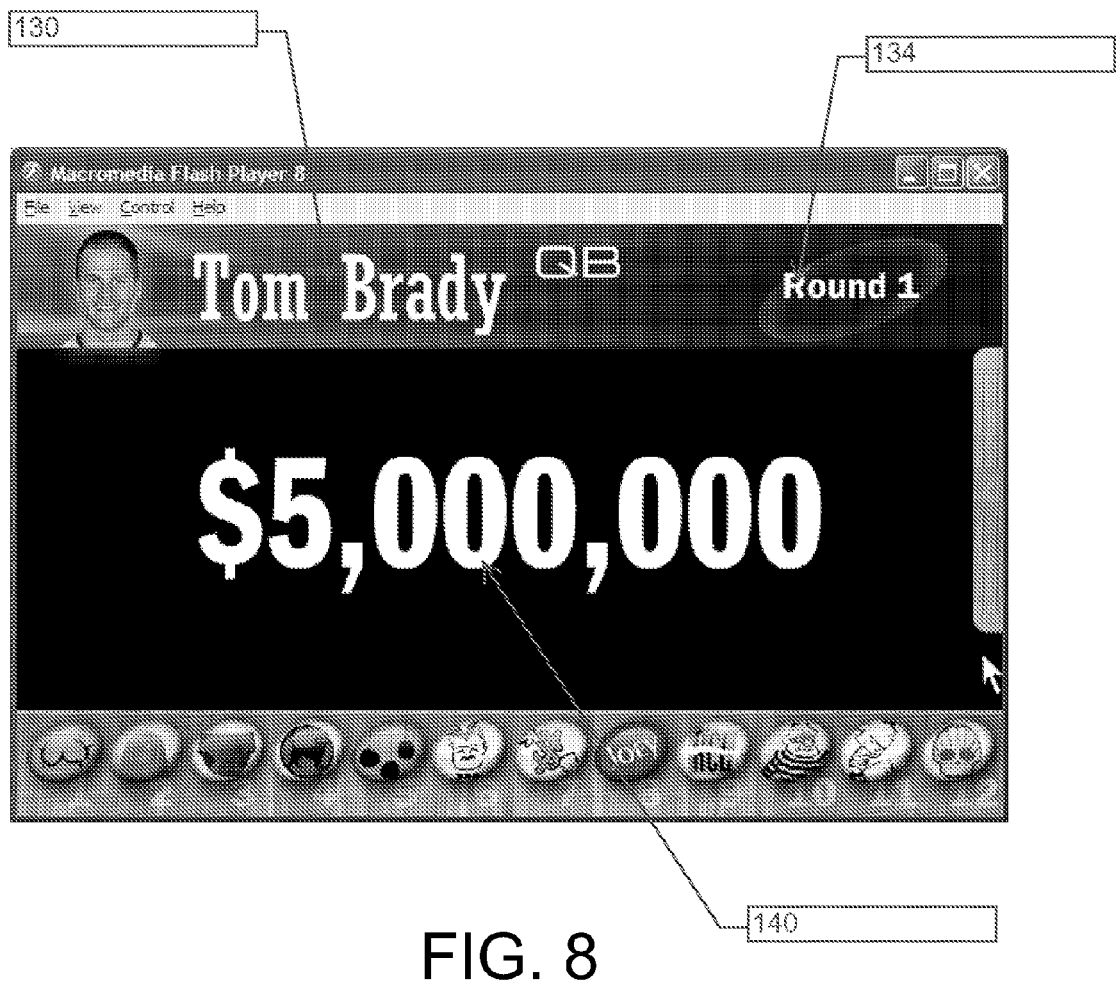
Figure 9:
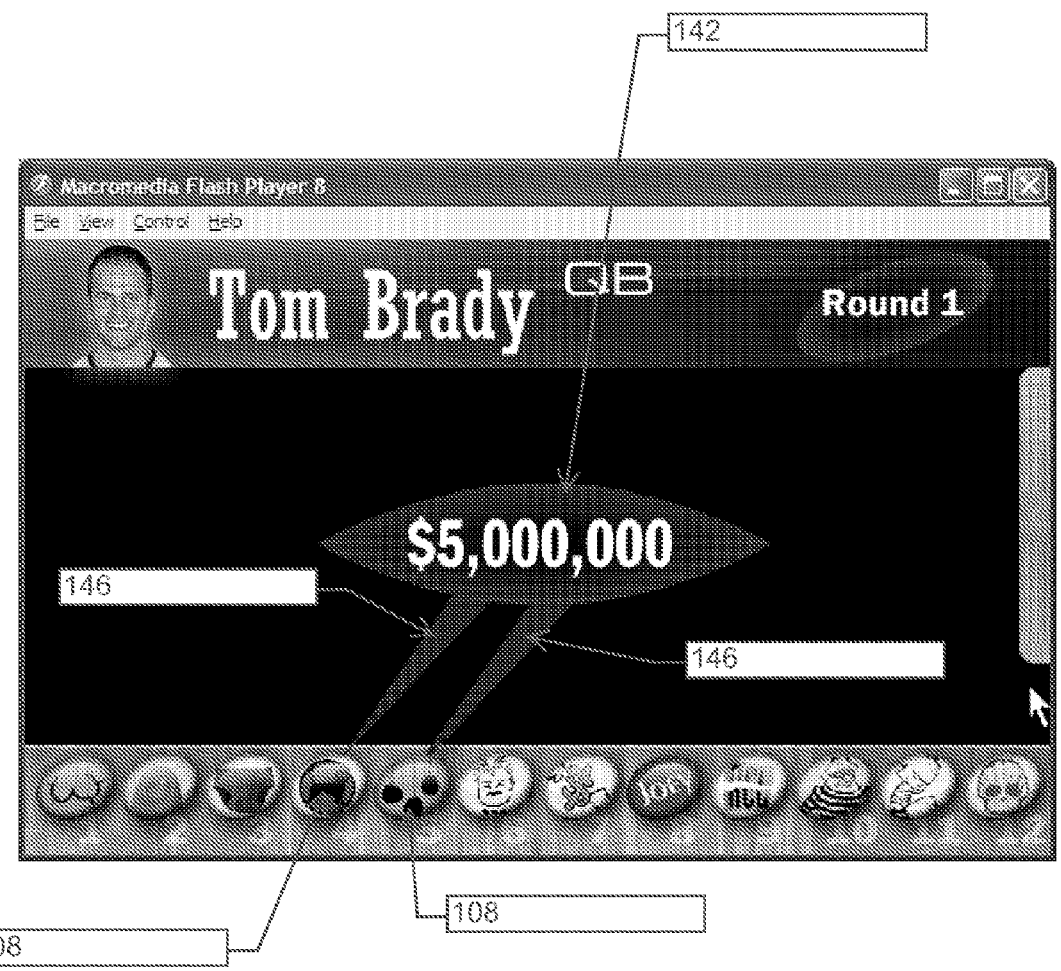
Figure 10:
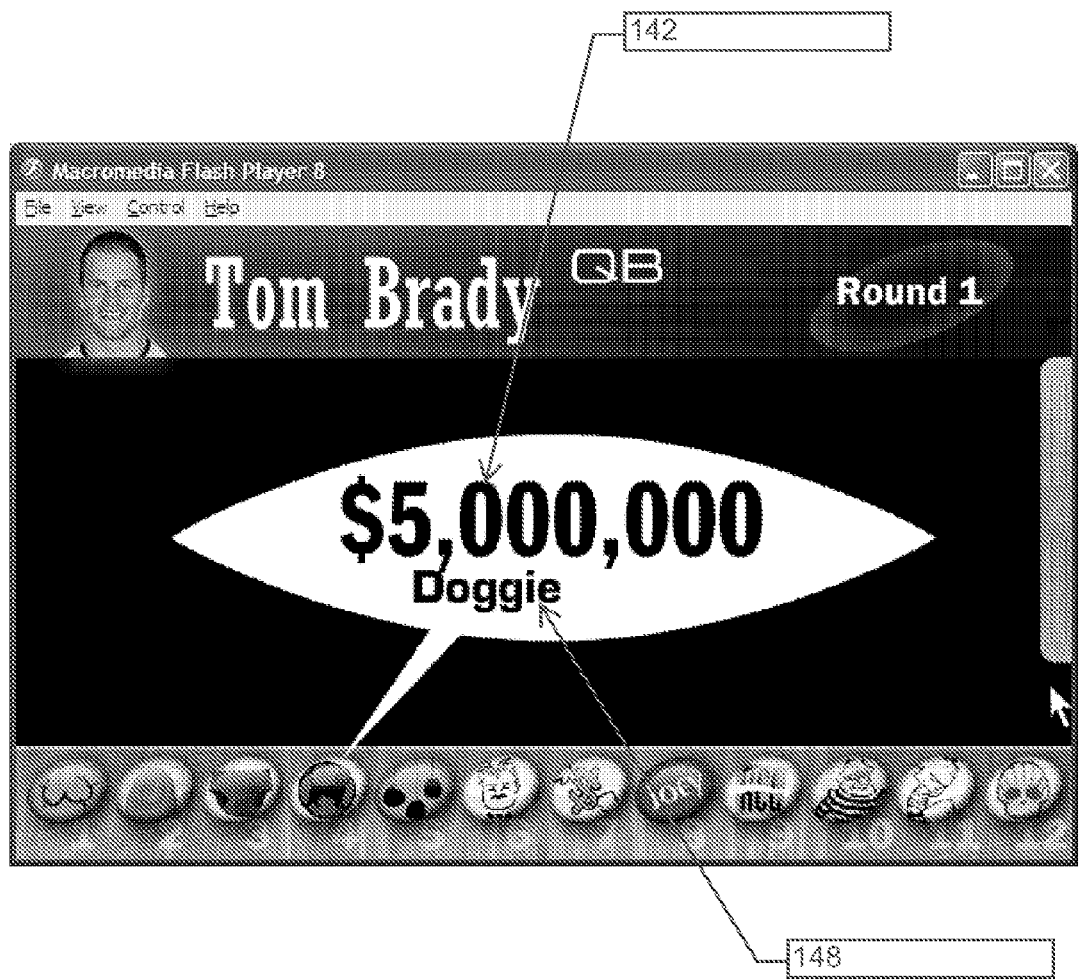
Figure 11:
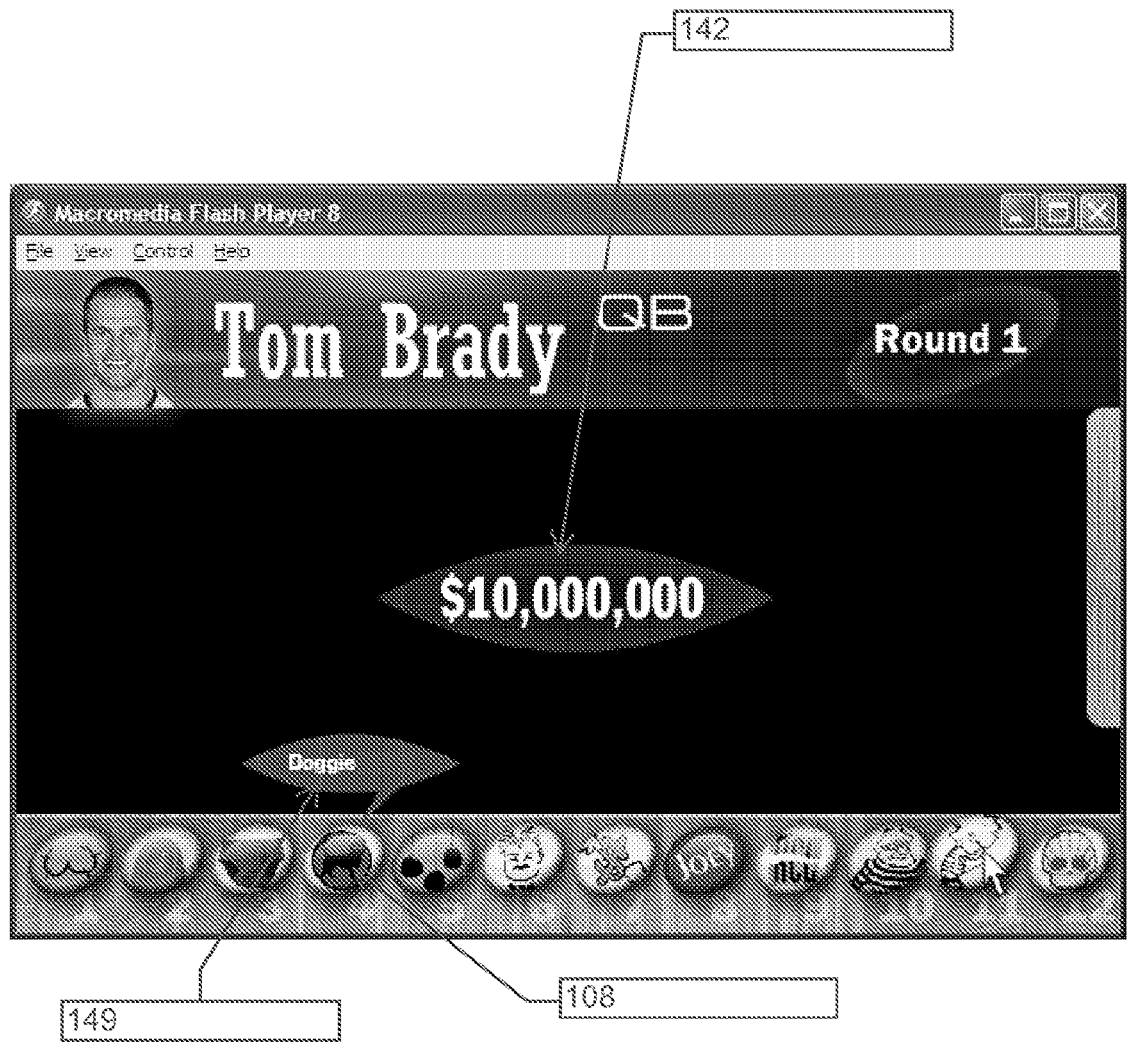
Figure 12:
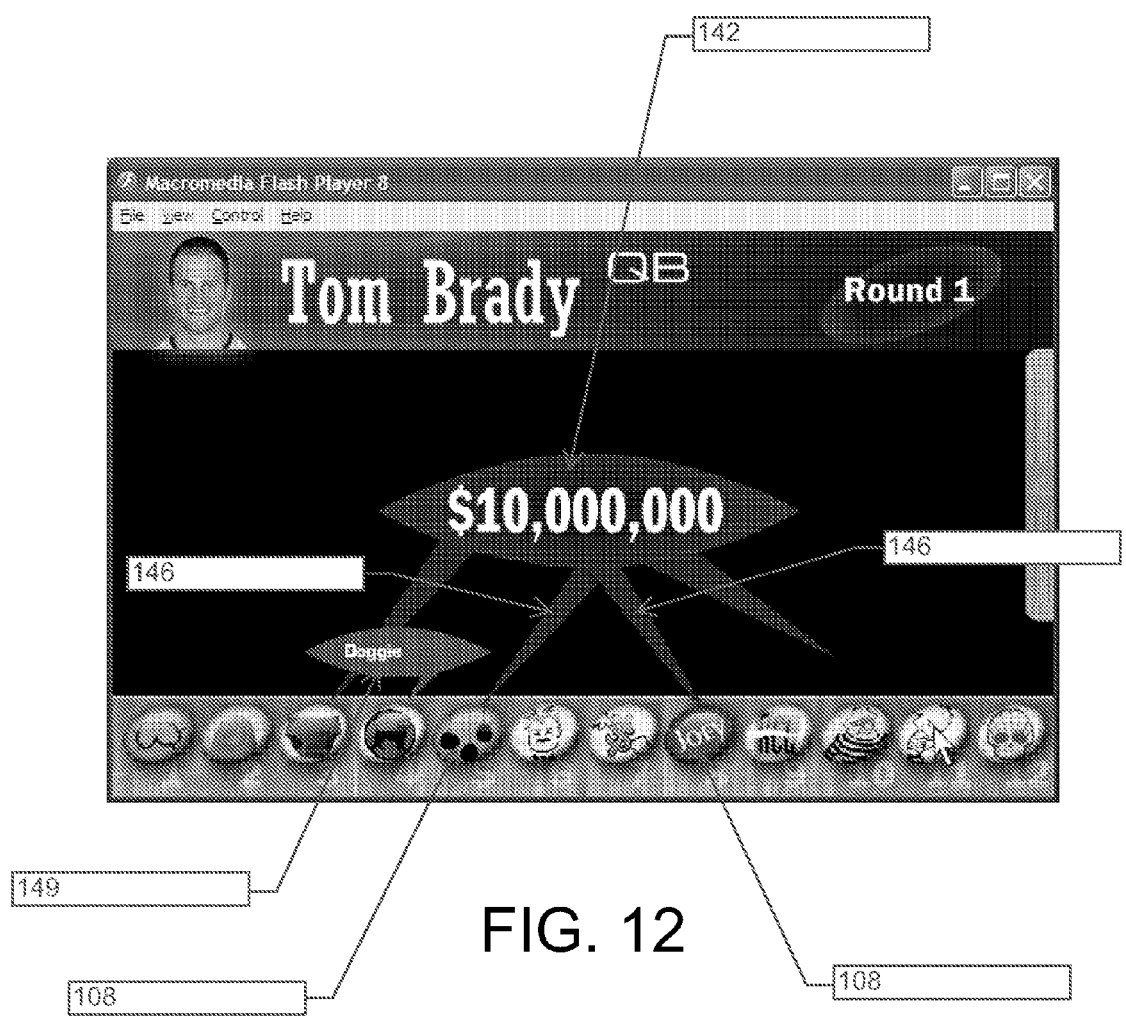
Figure 13:
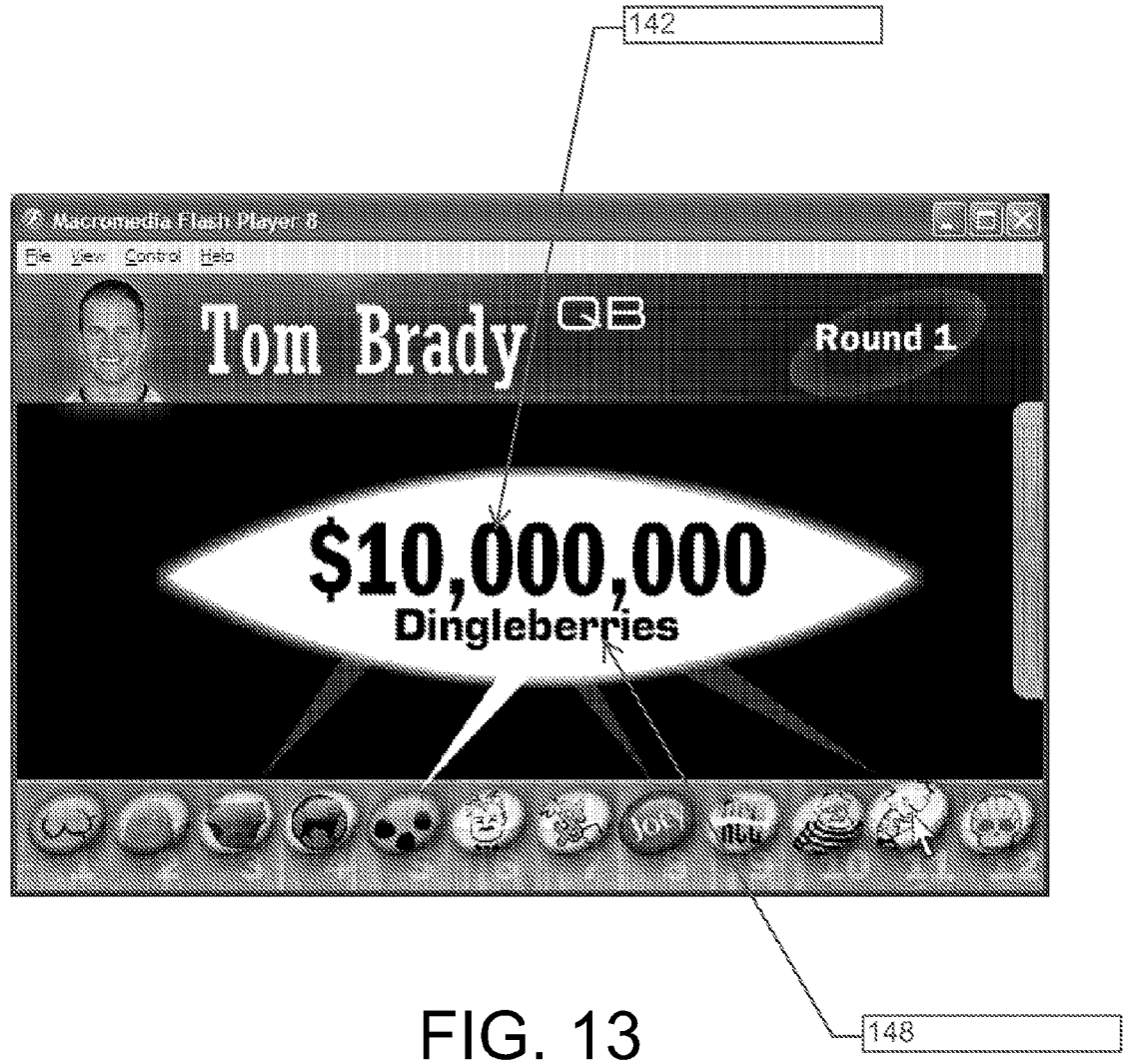
Figure 14:
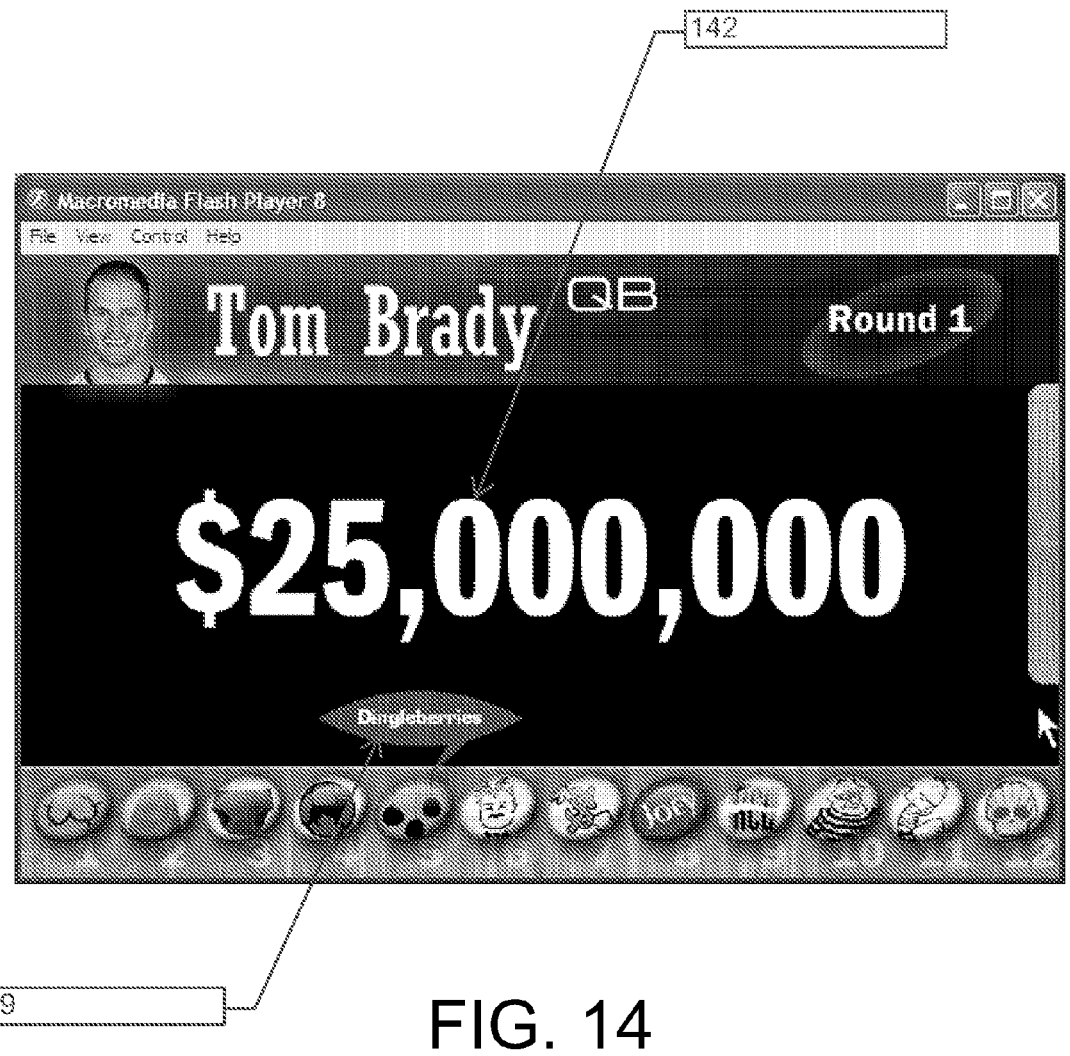
Figure 15:
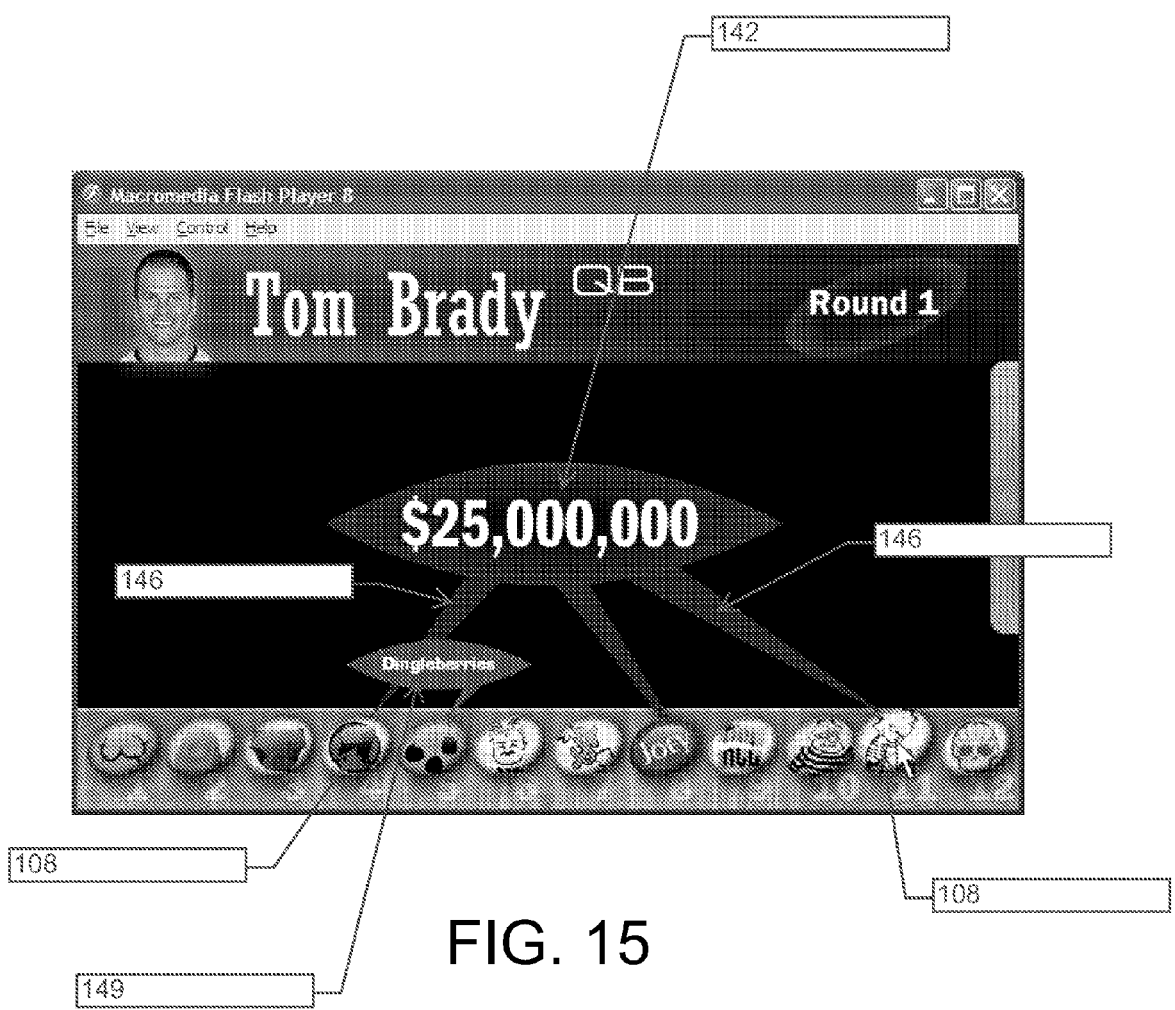
Figure 16:
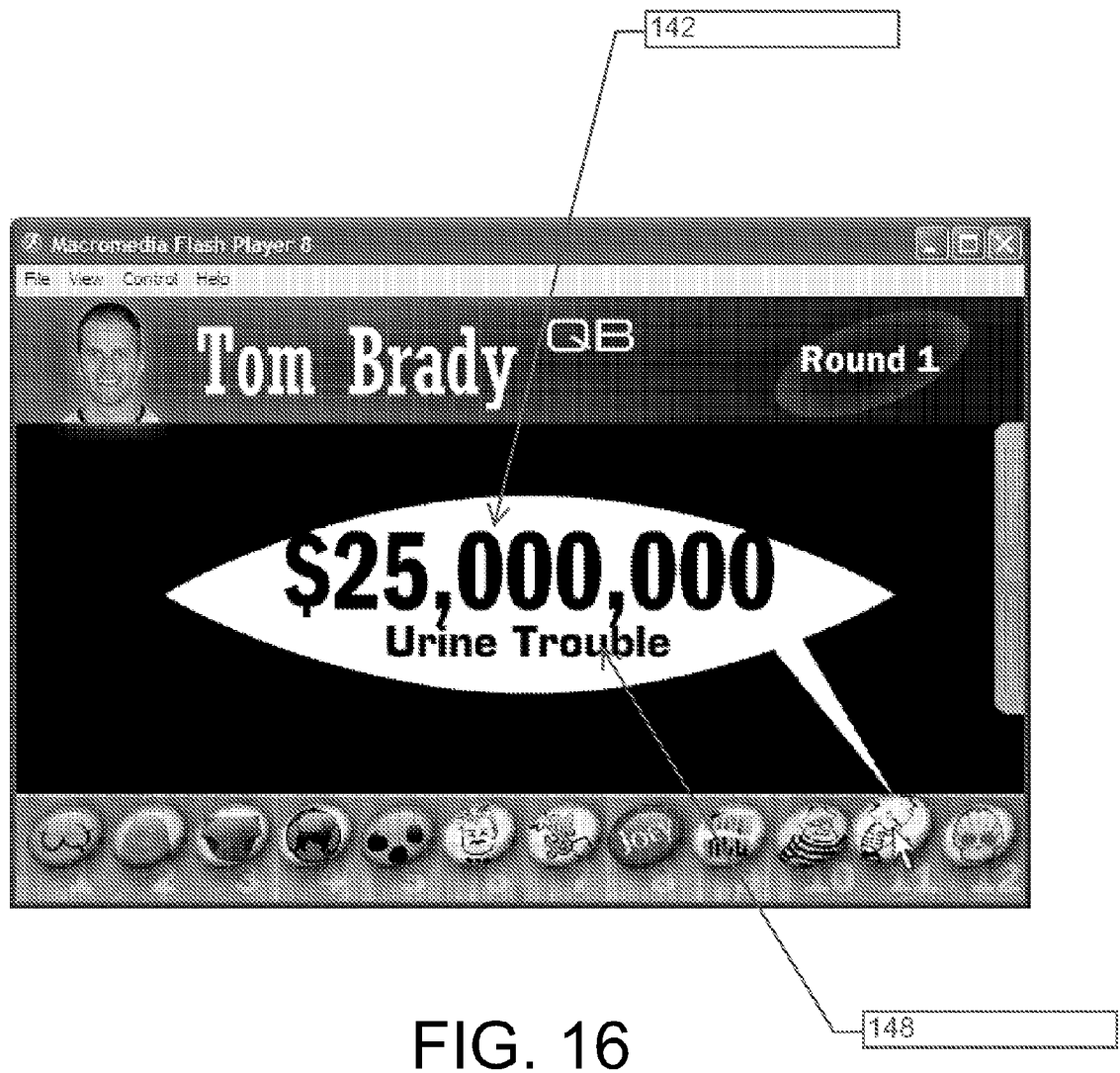
Figure 17:
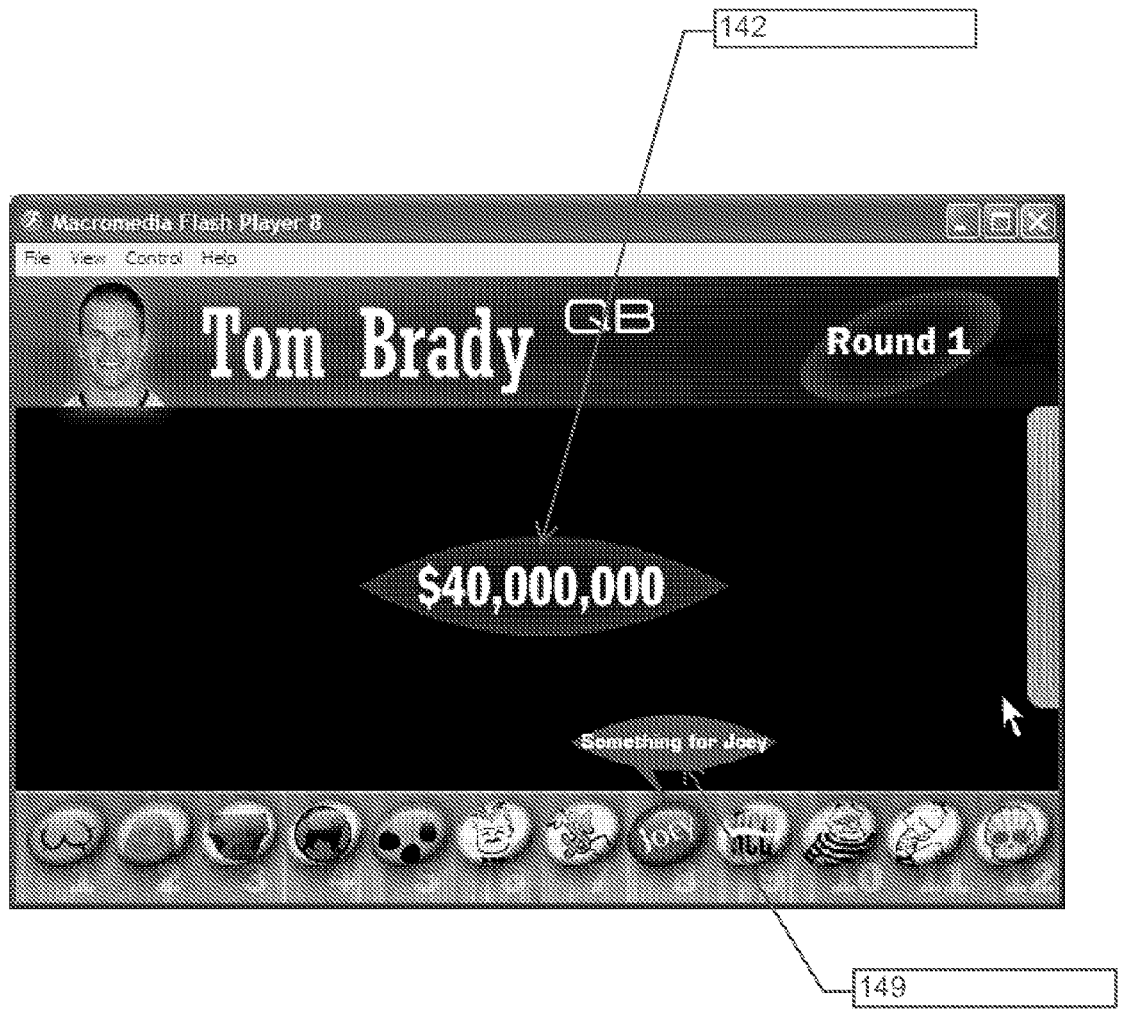
Figure 18:
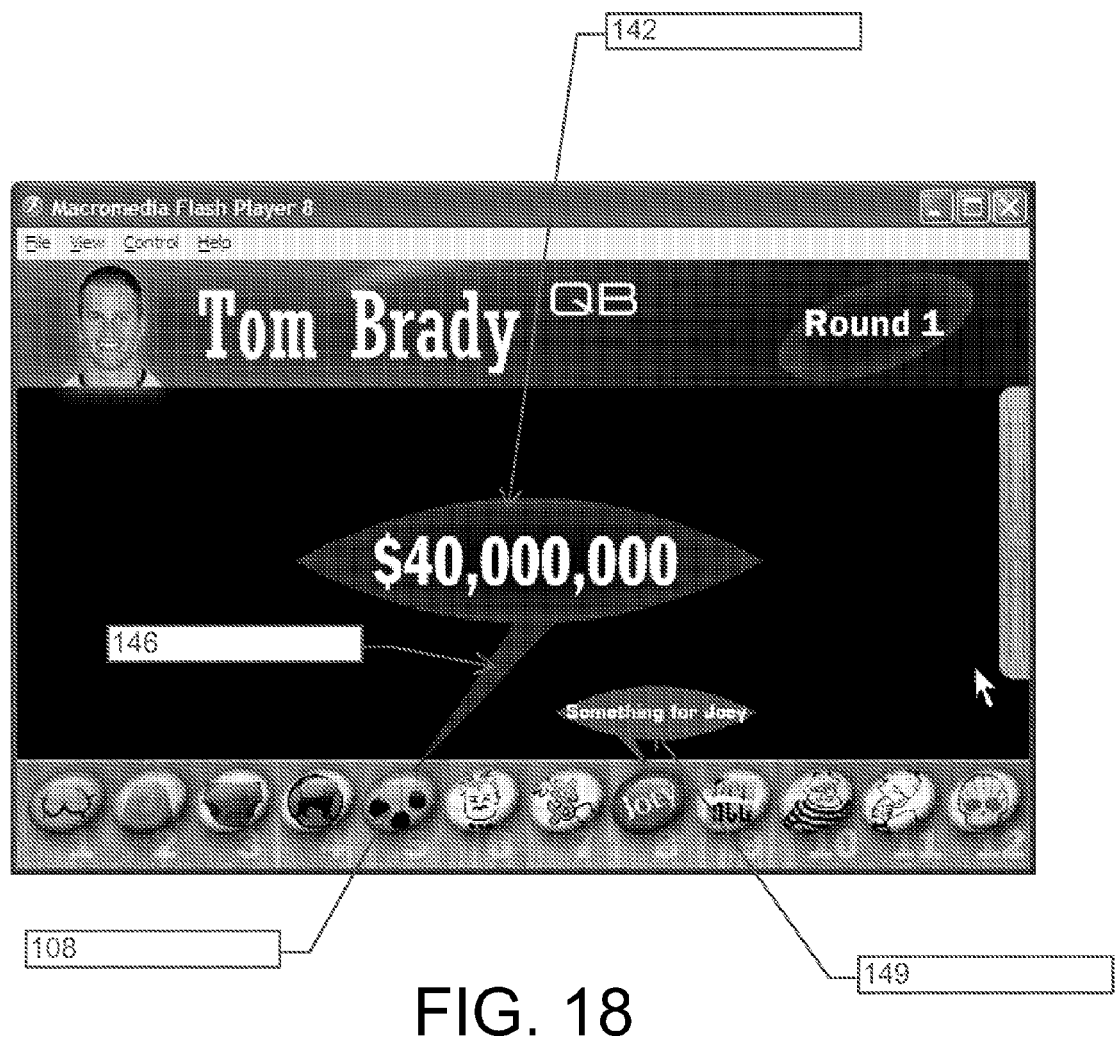
Figure 19:
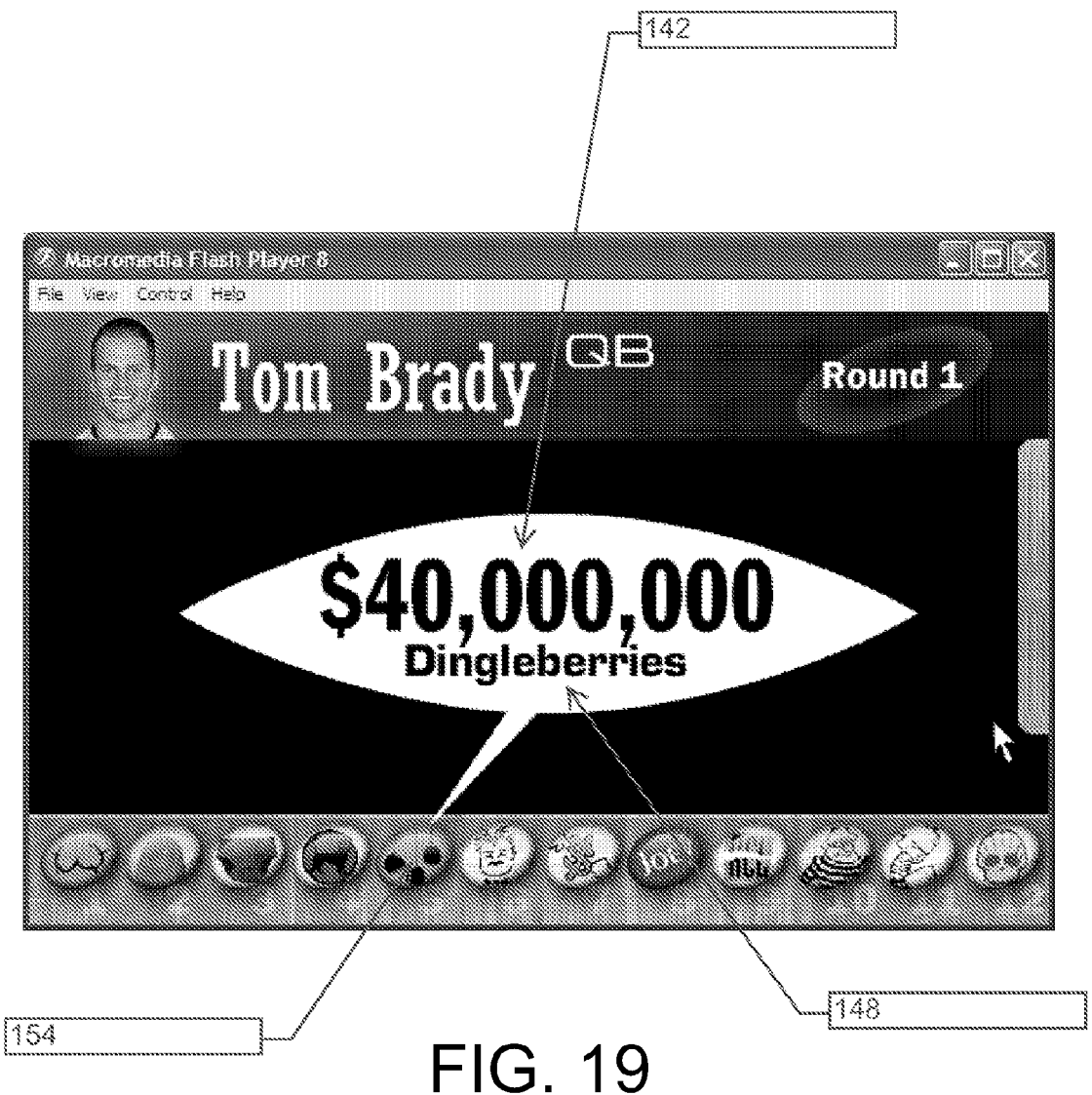
Figure 20:
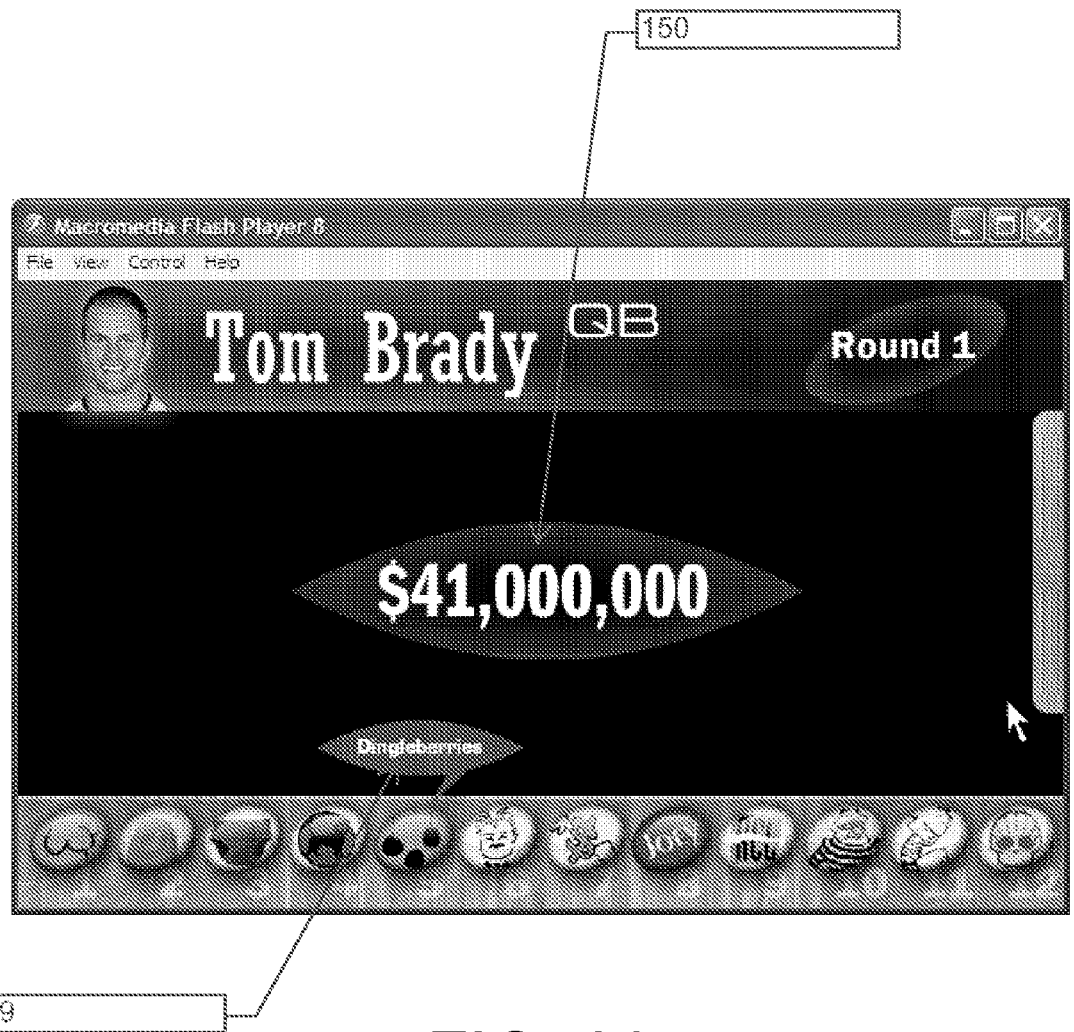
Figure 21:
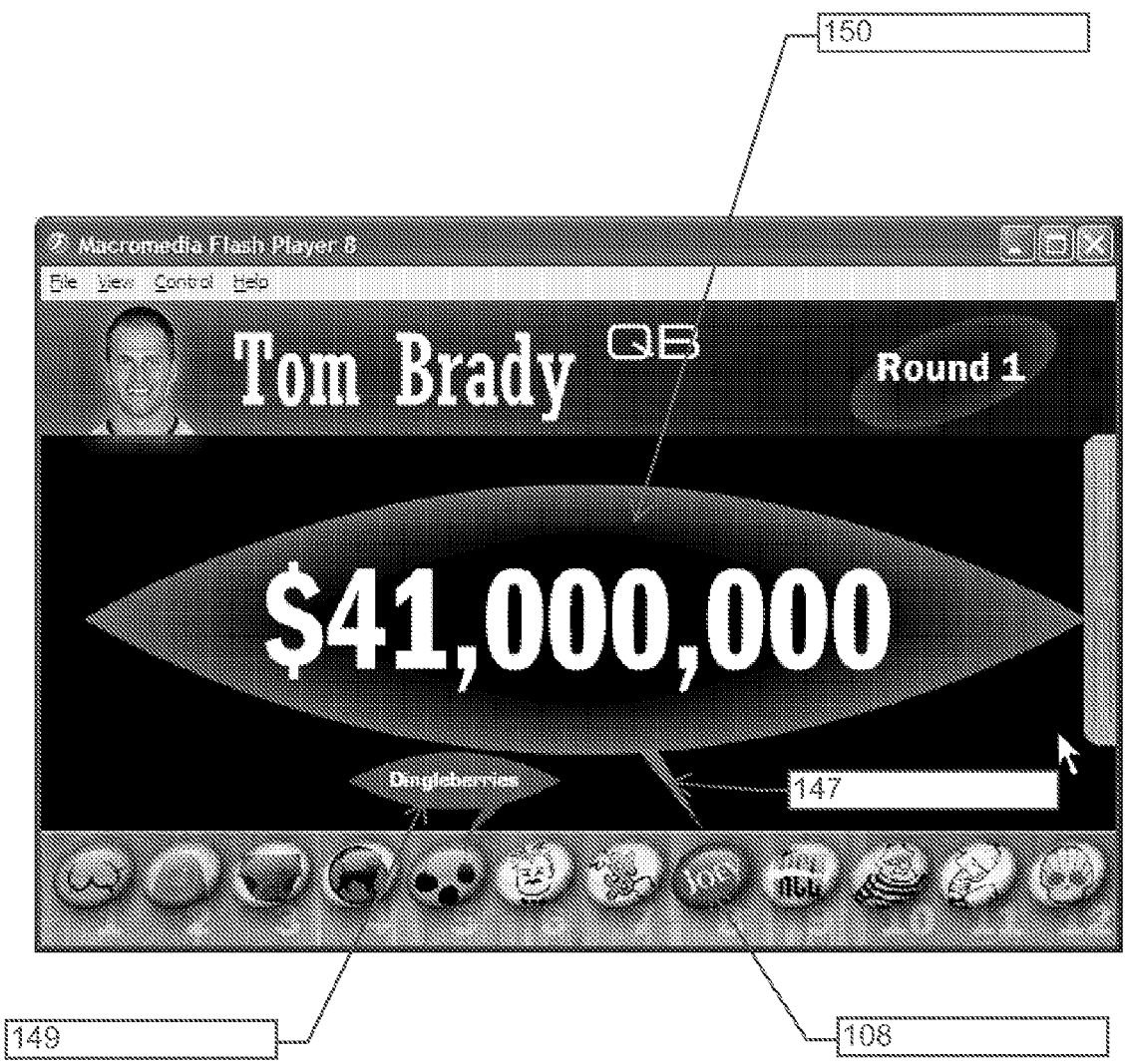
Figure 22:
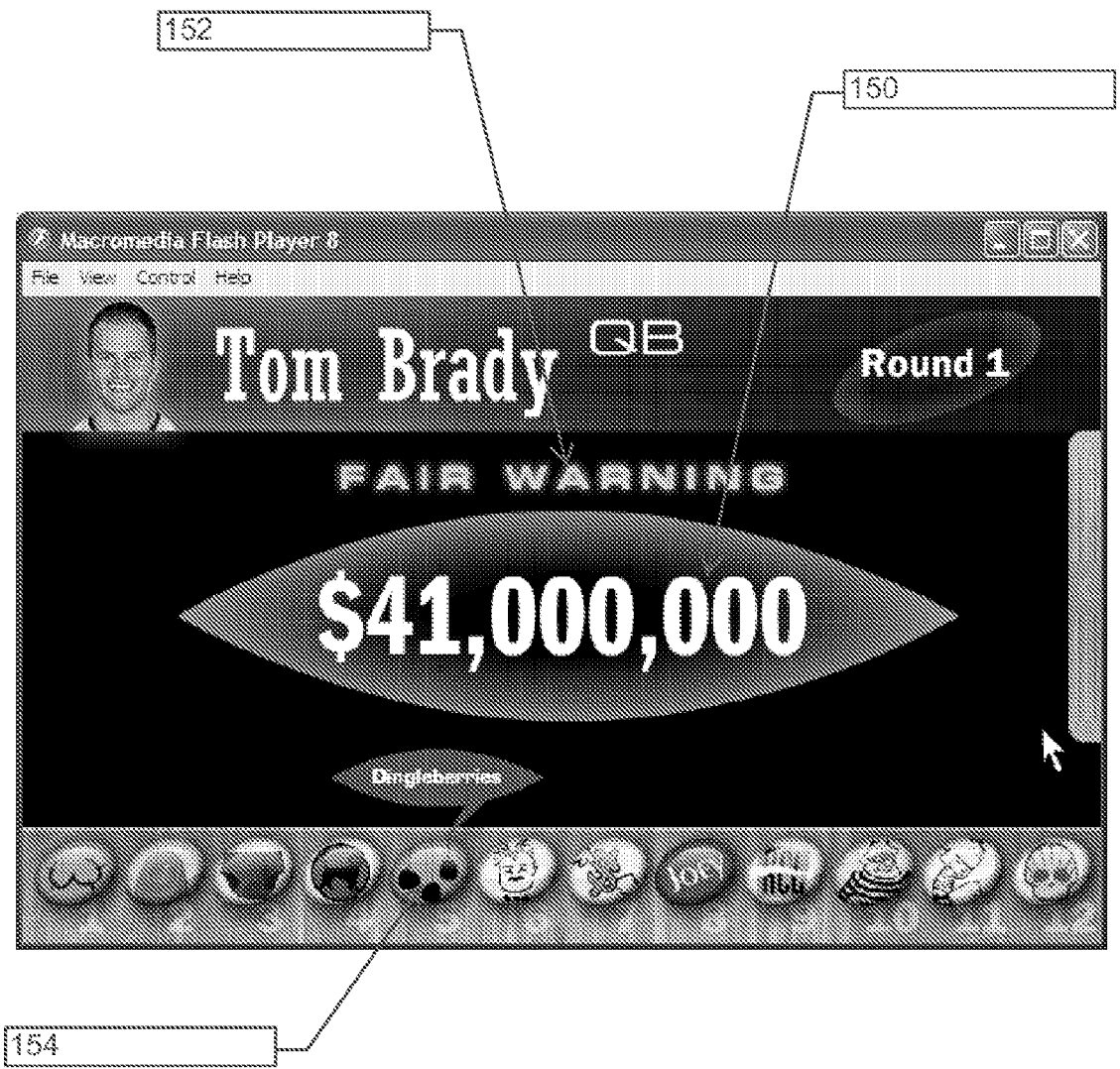

Once the athlete is nominated and all participating bidders are logged in, the auction for the particular athlete may begin as shown in the user interface screen of FIG. 8. Bidding on the athlete 130 is begun using an opening bid level 140 of $5,000,000. The opening bid may be pre-determined or may be calculated based on statistical data of the particular player. For example, an athlete with highly favorable playing statistics may command a higher starting bid.

Participants can be allotted a specific budget of imaginary money from which they can purchase players during the auction process. This budget amount can be established, on an annual basis, by the program developers. A participant's budget of imaginary money from which said participant can purchase a player during the auction process can be displayed in a graphical user interface, for example at 120 in FIG. 4. This budget amount can be recalculated for display during the auction drafting process whenever said participant has successfully purchased a player.

Bidding is prompted by the auctioneer, again through prerecorded multimedia clips, as shown in FIGS. 9-21. The use of clips in this live auction format has the advantage of giving a realistic "feel" to the experience, both by implementing an aural and visual interface and by prompting fast-paced bidding by all of the participating bidders. As shown in the Figures, each of the icons 108 representing the participating bidder teams can bid on the player at the current bid level shown at 142. A participant can execute a bid during the auction process by way of single clicking with a computer mouse on their assigned team icon. A participant can also execute a bid during the auction process by hitting the B key (or some other key) on a computer keyboard.

When a particular bidder team executes the bid, a bid signal is sent to the software (for example through a simple keystroke on the participating bidder's computer) and a directional graphical element 146 (such as an arrow) is dynamically displayed to indicate that the bidder team has just bid on the nominated player. When multiple participating bidders bid on the player, several arrows 146 may appear in rapid succession, which adds to the realistic environment of the auction. The appearance and sound accompanying the arrows 146 can convey to the bidders that this particular athlete is in high demand and that the bid price will likely rise in the next iteration of bid level. As a result, a participating bidder anticipating further bidding on this particular athlete can begin to think ahead and to re-evaluate the team roster in light of the team's budget amount, overall anticipated team strengths and weaknesses, and in comparison to other teams present at the auction. Alternatively, or in addition to the directional graphical element 146, other textual, iconic or graphical means may be used to indicate that a participating bidder has just bid on the nominated player. For example, the application may visually manipulate the icon 108 by dynamically changing the color, shape and/or size of the icon 108 so as to indicate that a participating bidder has just bid on the nominated player.

In this embodiment, the winning bid at the current bid level is preferably awarded to the first participating bidder to execute the bid, and the first bidder's team name is displayed at 148 next to the winning bid, as shown in FIGS. 10, 13, 16 and 19. In the next iteration of bid level, the team name of the current high bidder may be displayed at 149, as shown in FIGS. 11-12, 14-15, 17-18, and 20-21. At each bid level, the auctioneer may prompt a participating bidder to make a bid through pre-recorded multimedia clips, as shown, for example, at 147 in FIG. 21.

Figure 23:
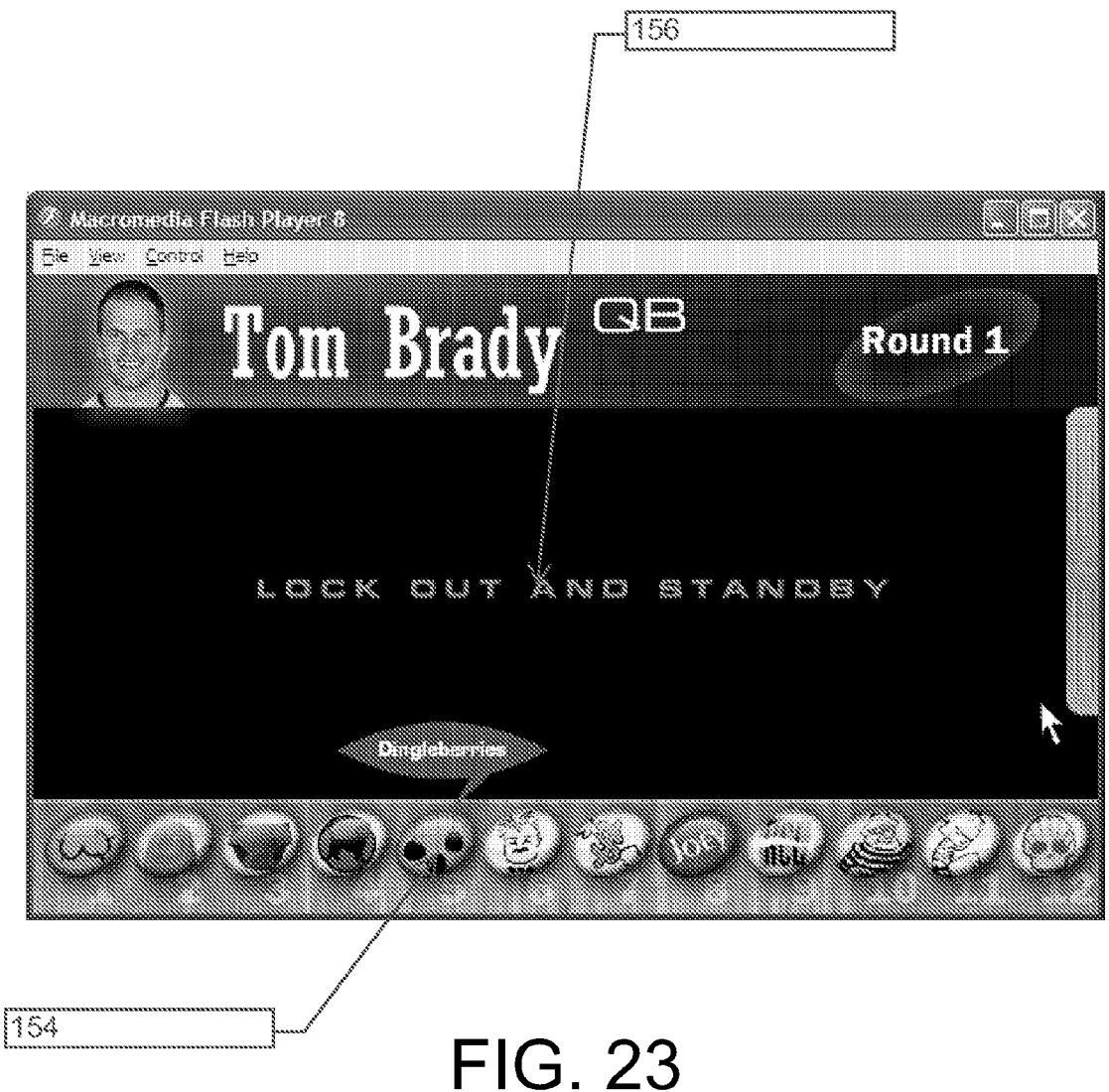
Figure 24:
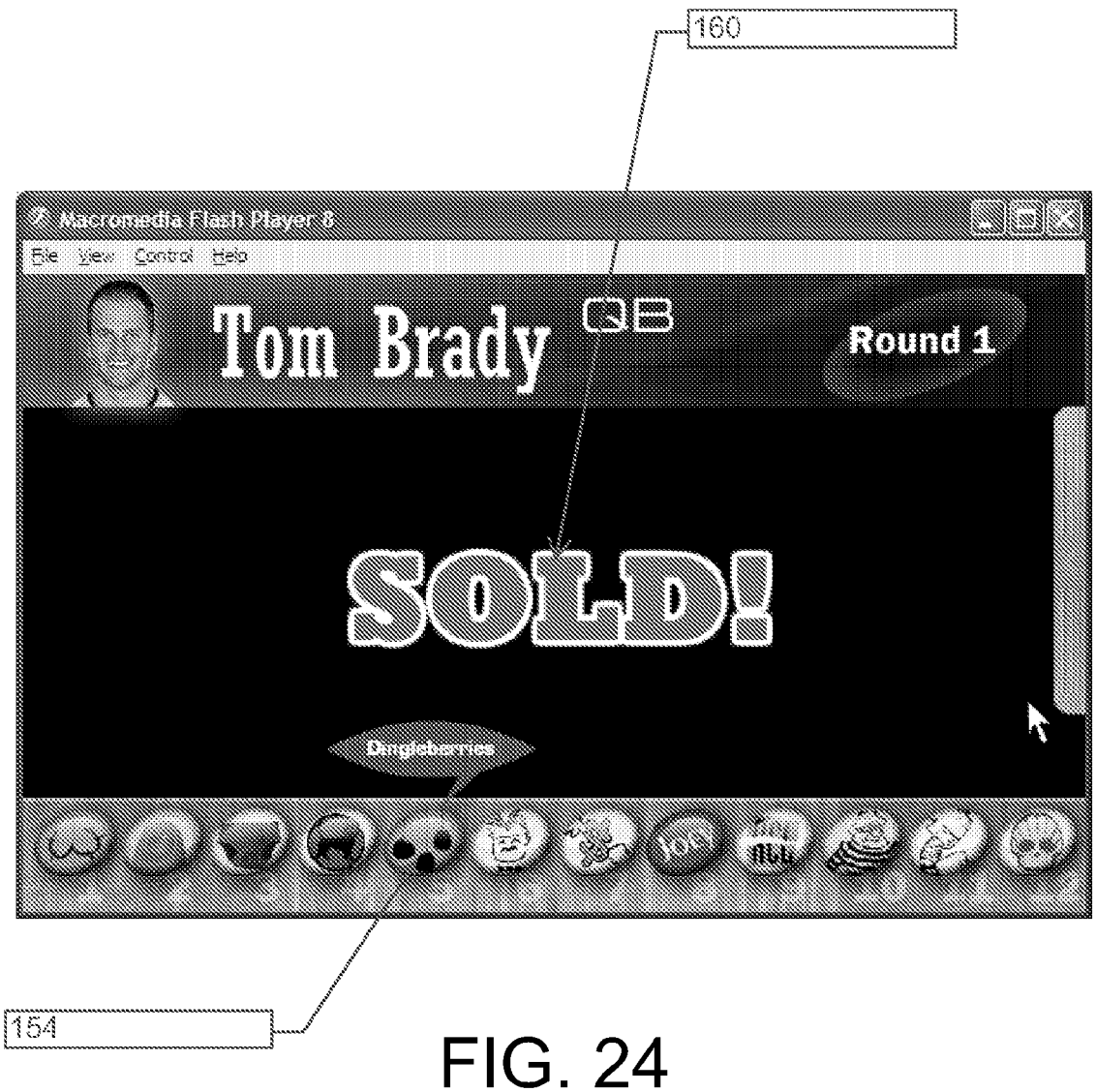
Figure 25:
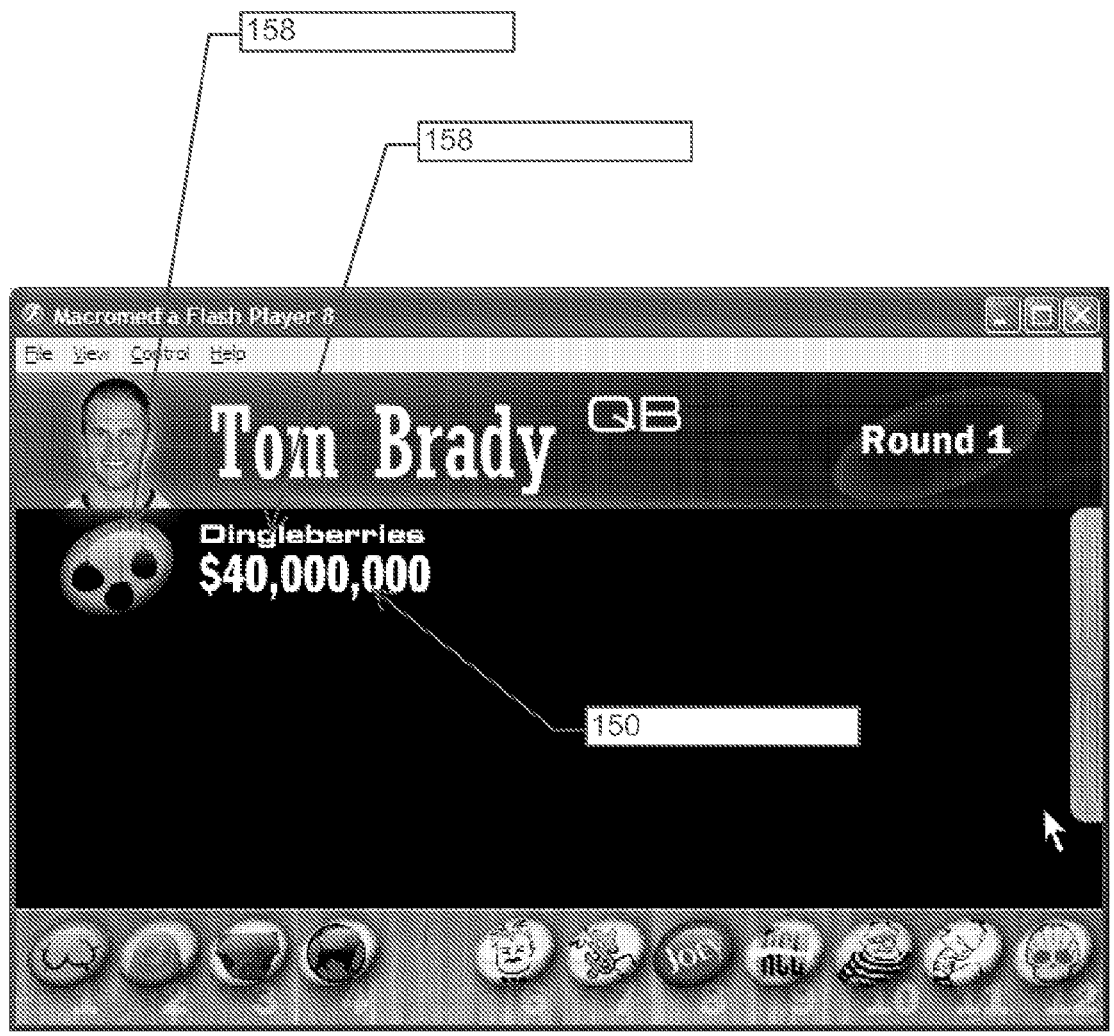

Bid levels are raised in succession and multiple bids from the participating bidders are taken until the maximum bid level is reached that a single bidder is willing to accept. This is illustrated in FIGS. 19-22, wherein a final bid level 142 of $40,000,000 is shown to be executed by the team "Dingleberries" at 154 and none of the participating bidders are willing to execute a bid at the next bid level 150 of $41,000,000. On the screen shown in FIG. 22, a timed "Fair Warning" signal is given at 152 giving all of the participating bidders notice that the auction is about to close. At FIG. 23, a "lockout" notice is provided at 156 while final calculations are made in the software to allocate and associate the acquired player with the participating bidder's team 154. After this process is completed, a 'SOLD" announcement is made and shown at 160 of FIG. 24. A participant's team logos and names can also be displayed at 158 next to a winning bid level 150 once a participant has won the item for sale as shown in FIG. 25. As with all of the graphical elements and animations shown throughout these screens, an accompanying multimedia clip may be played.

Once a player has been acquired by a participating bidder, the program software automatically disables said player within the graphical user interface used for nominating players such that the player cannot be nominated again. Any participant can be automatically locked out of the nomination and bidding process by the program once all of the participant's required roster positions have been successfully filled. A graphical user interface can automatically display, in roster format, all the players acquired by a specific participant, and a participant can view any other participant's roster at any given time during and after the drafting process.

Figure 26:
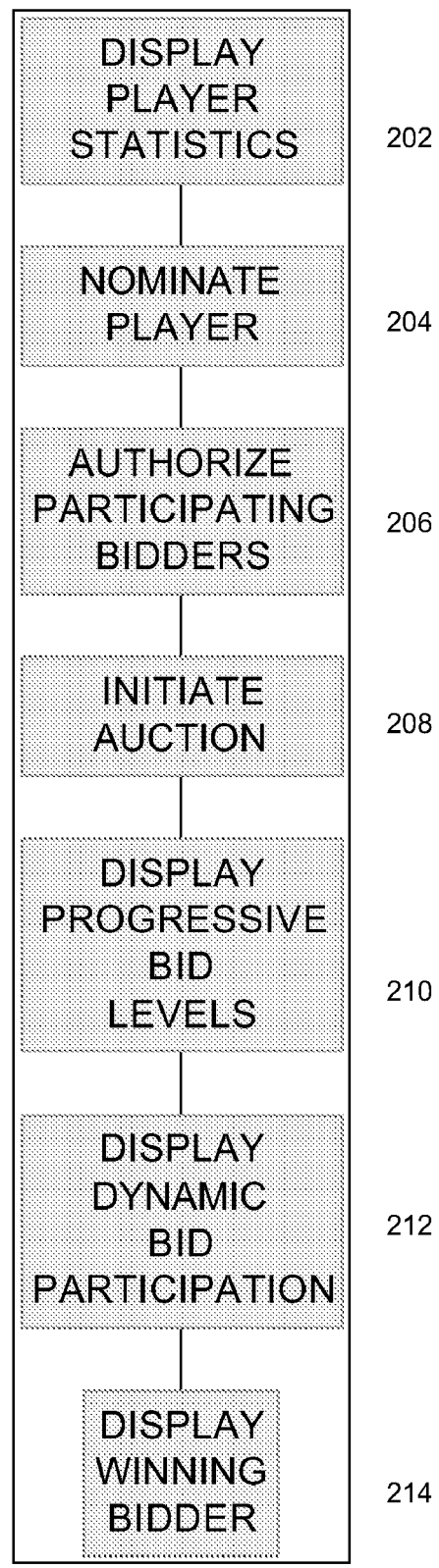
FIG. 26 is a flow diagram illustrating a method embodiment.

FIG. 26 is a flow diagram illustrating a general method embodiment of the above example. As shown at box 202, player statistics are illustrated for particular players available for nomination in the fantasy auction. One or more users then nominate a player to be auctioned at 204. Once the nominated player is determined, the software logs in and authorizes participating bidders at 206 who wish to participate in the auction for that particular player. At 208, the auction is initiated. At 210, bidding takes place through a live auction technique wherein multiple bid levels are displayed in an increasing fashion until a single high bidder remains. At 212, the dynamic display of the bid participation is generated throughout the progressive bid level display. The bid participation and simulation of the live auction through the use of software and pre-recorded multimedia takes place within this step and is repeated as necessary throughout the bidding process. Finally, at 214 a winning bidder is displayed.

As noted above, in order to add to the realism of the auction and to promote fast and entertaining bidding for a fantasy sports auction draft, multimedia clips are the preferred method for interfacing with the participating bidders in the auction. The multimedia clips may be used to prompt action by the participating bidders, acknowledge receipt of bids or other inquiries, and to relay information about particular athlete prospects and teams.

The attached Appendix A contains a sample script for a fantasy sports auction that illustrates the dynamic interface between the participating bidders and the software program. This script and figures are merely examples and should not be read as a limitation on the claims.

The material described herein provides only some of many possible implementations. For this reason, it is intended that the foregoing detailed description be understood as an illustration of selected forms that the invention can take and not as a definition of the invention. It is only the following claims, including all equivalents, that are intended to define the scope of this invention.

APPENDIX A

Sample Script for Fantasy Sports Auction

| Audio | Visuals |
| --- | --- |
| | JELLYVISION FOOTBALL LOGO APPEARS |
| | TAG LINE APPEARS: |
| SFX: logo slam | ANIMATION: YDKJ LOGO SLAMS ON |
| MUSIC: High octane Jack music | ANIMATION: JACK HEAD APPEARS (WITH BLACK UNDER EYES) |
| SFX: head butt + grunt | HEAD BUTTS SCREEN. FF LOGO APPEARS: |
| SFX: logo slam | "FANTASY FOOTBALL AUCTION DRAFT 2007" |
| MUSIC: fade out | |
| | FADE TO BLACK |
| HOST: I personally like to add a little lube before getting into the stance. | |
| SFX: Screen reset. | FADE IN FROM BLACK |
| HOST: Alright let's see who's next here . . . | ANIMATION: From Nomination Board . . . |
| SFX: Team Name highlights on board | |
| | Team 11 highlights. |
| HOST: . . . Team 11. | |
| | Team 11 on Nomination Board transitions to "Make Nomination" screen: |

APPENDIX A-continued

Sample Script for Fantasy Sports Auction

| Audio | Visuals |
|---|---|
| SFX: transition to "Make Nomination" screen | Team 11 + logo, owner appears over fill-in-the-blank. Disabled button says (nominate) near f/b: |
| MUSIC: Ask Music starts | _____ (nominate) |
| HOST: You've got 15 seconds to make a nomination . . . Team 12, you're "on deck". | ANIMATION: Clock appears and starts running. |
| SFX: GUI window open | ANIMATION: Team 11 owner clicks on button that opens the GUI window in front of rest of screen. GUI default is set to the the tab labeled: Players I Want. The |
| SFX: tab click | mouse moves over some of the players, then clicks over to Rosters tab. Team 11 is highlighted. Team 11 already has 1 player (which player?). Mouse rolls over Cash Remaining field to show only $89M left in account. |
| SFX: team tab click | Mouse clicks on Team 4. Team 4 has 3 players and only $21M left. |
| SFX: tab click | Mouse clicks back to Players I Want tab . . . meanwhile a couple of chat messages appear: |
| SFX: Chat msg on | {Logo} Joe K: I'll kill you if you nominate Tom Brady. |
| SFX: Chat msg on | {Logo} Arnie: i'm already out of chips!! |
| SFX: nominate icon CLICK | then mouse cursor in the QB list: clicks on the nomination icon next to Tom Brady. The GUI closes and the player name types itself out in the Nomination field. |
| SFX: GUI window close | |
| SFX: typing | |
| SFX/music: click–> musical flourish - cuts off ask music - building pad through Female voice announcement | Mouse clicks "Nominate" button. |
| FEMALE VOICE: Team 11 nominates . . . | |
| SFX: Morph + Slam! | ANIMATION: FIB field swirls into player image/stats. |
| MUSIC: Ask Music tempo increases | |
| FEMALE VOICE: Quarterback Tom Brady. | |
| nomination . . . Team 12, you're "on deck". | running. |
| SFX: GUI window open | ANIMATION: Team 11 owner clicks on button that opens the GUI window in front of rest of screen. GUI default is set to the the tab labeled: Players I Want. The |
| SFX: tab click | mouse moves over some of the players, then clicks over to Rosters tab. Team 11 is highlighted. Team 11 already has 1 player (which player?). Mouse rolls over Cash Remaining field to show only $89M left in account. |
| SFX: team tab click | Mouse clicks on Team 4. Team 4 has 3 players and only $21M left. |
| SFX: tab click | Mouse clicks back to Players I Want tab . . . meanwhile a couple of chat messages appear: |
| SFX: Chat msg on | {Logo} Joe K: I'll kill you if you nominate Tom Brady. |
| SFX: Chat msg on | {Logo} Arnie: i'm already out of chips!! |
| SFX: nominate icon CLICK | then mouse cursor in the QB list: clicks on the nomination icon next to Tom Brady. The GUI closes and the player name types itself out in the Nomination field. |
| SFX: GUI window close | |
| SFX: typing | |
| SFX/music: click–> musical flourish - cuts off ask music - building pad through Female voice announcement | Mouse clicks "Nominate" button. |
| FEMALE VOICE: Team 11 nominates . . . | |
| SFX: Morph + Slam! | ANIMATION: FIB field swirls into player image/stats. |
| MUSIC: Ask Music tempo increases | |
| FEMALE VOICE: Quarterback Tom Brady. | |
| nomination . . . Team 12, you're "on deck". | running. |
| SFX: GUI window open | ANIMATION: Team 11 owner clicks on button that opens the GUI window in front of rest of screen. GUI default is set to the the tab labeled: Players I Want. The |

APPENDIX A-continued

Sample Script for Fantasy Sports Auction

| Audio | Visuals |
|---|---|
| SFX: tab click | mouse moves over some of the players, then clicks over to Rosters tab. Team 11 is highlighted. Team 11 already has 1 player (which player?). Mouse rolls over Cash Remaining field to show only $89M left in account. |
| SFX: team tab click | Mouse clicks on Team 4. Team 4 has 3 players and only $21M left. |
| SFX: tab click | Mouse clicks back to Players I Want tab . . . meanwhile a couple of chat messages appear: |
| SFX: Chat msg on | {Logo} Joe K: I'll kill you if you nominate Tom Brady. |
| SFX: Chat msg on | {Logo} Arnie: i'm already out of chips!! |
| SFX: nominate icon CLICK | then mouse cursor in the QB list: clicks on the nomination icon next to Tom Brady. The GUI closes and the player name types itself out in the Nomination field. |
| SFX: GUI window close | |
| SFX: typing | |
| SFX/music: click–> musical flourish - cuts off ask music - building pad through Female voice announcement | Mouse clicks "Nominate" button. |
| FEMALE VOICE: Team 11 nominates . . . | |
| SFX: Morph + Slam! | ANIMATION: FIB field swirls into player image/stats. |
| MUSIC: Ask Music tempo increases | |
| FEMALE VOICE: Quarterback Tom Brady. | |
| nomination . . . Team 12, you're "on deck". | running. |
| SFX: GUI window open | ANIMATION: Team 11 owner clicks on button that opens the GUI window in front of rest of screen. GUI default is set to the the tab labeled: Players I Want. The |
| SFX: tab click | mouse moves over some of the players, then clicks over to Rosters tab. Team 11 is highlighted. Team 11 already has 1 player (which player?). Mouse rolls over Cash Remaining field to show only $89M left in account. |
| SFX: team tab click | Mouse clicks on Team 4. Team 4 has 3 players and only $21M left. |
| SFX: tab click | Mouse clicks back to Players I Want tab . . . meanwhile a couple of chat messages appear: |
| SFX: Chat msg on | {Logo} Joe K: I'll kill you if you nominate Tom Brady. |
| SFX: Chat msg on | {Logo} Arnie: i'm already out of chips!! |
| SFX: nominate icon CLICK | then mouse cursor in the QB list: clicks on the nomination icon next to Tom Brady. The GUI closes and the player name types itself out in the Nomination field. |
| SFX: GUI window close | |
| SFX: typing | |
| SFX/music: click–> musical flourish - cuts off ask music - building pad through Female voice announcement | Mouse clicks "Nominate" button. |
| FEMALE VOICE: Team 11 nominates . . . | |
| SFX: Morph + Slam! | ANIMATION: FIB field swirls into player image/stats. |
| MUSIC: Ask Music tempo increases | |
| FEMALE VOICE: Quarterback Tom Brady. | |

What is claimed is:

1. A method for conducting an online auction for selected goods utilizing a stored plurality of multimedia clips, the auction taking place among a plurality of online bidders, said method comprising:

logging in, via a processor, participating bidders from the plurality of bidders;

providing, via the processor, a dynamic visual representation of each of the participating bidders on a visual interface;

announcing, via the processor, the start of the auction by playing at least one of the plurality of multimedia clips;

selecting, via the processor, a good for bidding from a group of goods;

providing, via the processor, a series of progressively higher bid levels to the participating bidders for the selected good;

enabling, via the processor, each of the participating bidders to execute a bid at a current bid level for the selected good while providing representations for bid executions at the current bid level with the visual interface to each of the participating bidders and playing at least one of the plurality of multimedia clips;

determining, by the processor, a winning bidder and associating the selected good with the winning bidder;

repeating, via the processor, the selection and bidding process for a plurality of goods remaining in the group; and compiling, by the processor, a simulated set of winning selected goods associated with each of the winning bidders.

2. The method of claim 1 further comprising limiting the amount of time that bids are executed for one or more bid levels.

3. The method of claim 1 further comprising displaying the winning bidder to the participating bidders.

4. The method of claim 1 wherein the selected good is a virtual character and the set is a roster of virtual characters.

5. The method of claim 1 wherein each good in the group of goods is associated with a set of dynamically changing characteristics and statistics.

6. The method of claim 5 wherein the changing characteristics and statistics affect the desirability of the particular good.

7. The method of claim 5 further comprising incorporating the characteristics and statistics into the simulated set of winning selected goods.

8. The method of claim 5 wherein the simulated set of winning selected goods is configured to perform simulated interaction to vary the characteristics and statistics.

9. The method of claim 1 further comprising tracking funding credits associated with each of the participating bidders and deducting credits from the winning bidder in conjunction with the highest bid.

10. The method of claim 4 further comprising assigning ah initial bid increment level based on information associated with the selected good.

11. The method of claim 5 wherein the information associated with the selected good is statistical data.

12. The method of claim 1 wherein a participating bidder may execute a bid by entering a keystroke on a keyboard.

13. The method of claim 1 further comprising enabling a live chat window visible to the participating bidders to allow communication among participating bidders concurrently with the auction.

14. The method of claim 1 further comprising selectively displaying information associated with at least one participating bidder.

15. The method of claim 1 further comprising denying one or more participating bidders the opportunity to bid based on information associated with the one or more participating bidders.

16. The method of claim 1 further comprising displaying a plurality of goods available for bidding by participating bidders.

17. A method for conducting a virtual auction in conjunction with the playing of a stored plurality of multimedia clips, the method comprising:

initiating, via a processor, an auction session including a plurality of participating bidders;

displaying, via the processor, icons representative of the participating bidders;

selectively displaying, via the processor, data associated with a plurality of virtual goods;

enabling, via the processor, the selection of a good from the plurality of virtual goods;

displaying, via the processor, a series of progressively higher bid levels associated with the selected virtual good to the participating bidders and prompting the participating bidders to make bids by playing at least one of the multimedia clips;

receiving, at the processor, bid execution signals at a current bid level from at least one of the participating bidders and providing, via the processor, multimedia representations for all bid execution signals at the current bid level to the participating bidders; and determining, by the processor, a winning bidder based on the receipt of a bid execution signal associated with the highest bid level.

18. The method of claim 17 wherein providing multimedia representations for at least one bid execution signal includes providing visual representations for at least one bid execution signal on a display.

19. The method of claim 17 further comprising limiting the amount of time that bids are executed for one or more bid levels.

20. The method of claim 17 further comprising displaying the winning bidder to the participating bidders.

21. The method of claim 17 further comprising tracking funding credits associated with each of the participating bidders and deducting credits from the winning bidder in conjunction with the highest bid.

22. The method of claim 21 further comprising assigning an initial bid increment level based on information associated with the selected good.

23. The method of claim 22 wherein a bidder may execute a bid by entering a keystroke on a keyboard.

24. The method of claim 17 further comprising enabling a live chat window visible to the participating bidders to allow communication among participating bidders concurrently with the auction.

25. The method of claim 17 further comprising selectively displaying information associated with at least one participating bidder.

26. The method of claim 17 further comprising denying one or more participating bidders the opportunity to bid based on information associated with the one or more participating bidders.

27. The method of claim 17 further comprising displaying a plurality of goods available for bidding by participating bidders.

28. The method of claim 17 further comprising displaying data related to a selected good to the participating bidders.

29. A method for conducting a fantasy sports auction for a plurality of players utilizing a plurality of pre-recorded multimedia clips, the method comprising:

initiating, via a processor, an auction session including a plurality of participating team bidders;

representing, via the processor, the team bidders as icons on a user interface for the auction session;

selectively displaying, via the processor, data associated with an individual player during the auction session;

displaying, via the processor, a starting bid for the individual player on the user interface;

displaying, via the processor, a series of progressively higher bid levels associated with the player and prompting the participating bidders to make bids by playing at least one of the multimedia clips;

receiving, at the processor, bids at a current bid level from the participating bidders and providing, via the processor, visual representations for each bid received at the current bid level to the participating bidders on the user interface; and determining, by the processor, a winning bidder based on the receipt of a bid associated with the highest bid level displayed.

30. The method of claim 29 further comprising limiting the amount of time that bids are executed for one or more bid levels.

31. The method of claim 30 further comprising displaying the winning bidder to the participating bidders.

32. The method of claim 31 further comprising tracking funding credits associated with each of the participating bidders and deducting credits from the winning bidder in conjunction with the highest bid.

33. The method of claim 29 further comprising assigning an initial bid increment level based on information associated with the selected good.

34. The method of claim 29 wherein a bidder may execute a bid by entering a keystroke on a keyboard.

35. The method of claim 29 further comprising enabling a live chat window visible to the participating bidders to allow communication among participating bidders concurrently with the auction.

36. The method of claim 29 further comprising selectively displaying information associated with at least one participating bidder.

37. The method of claim 29 further comprising denying one or more participating bidders the opportunity to bid based on information associated with the one or more participating bidders.

38. The method of claim 29 further comprising displaying a plurality of goods available for bidding by participating bidders.

* * * * *